June 4, 1963   J. P. LANNEN   3,091,970
AUTOMATIC UNIVERSAL BALANCE TESTING MACHINE
Filed Sept. 22, 1958   18 Sheets-Sheet 10
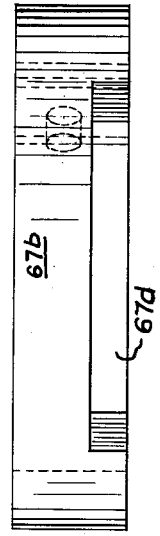
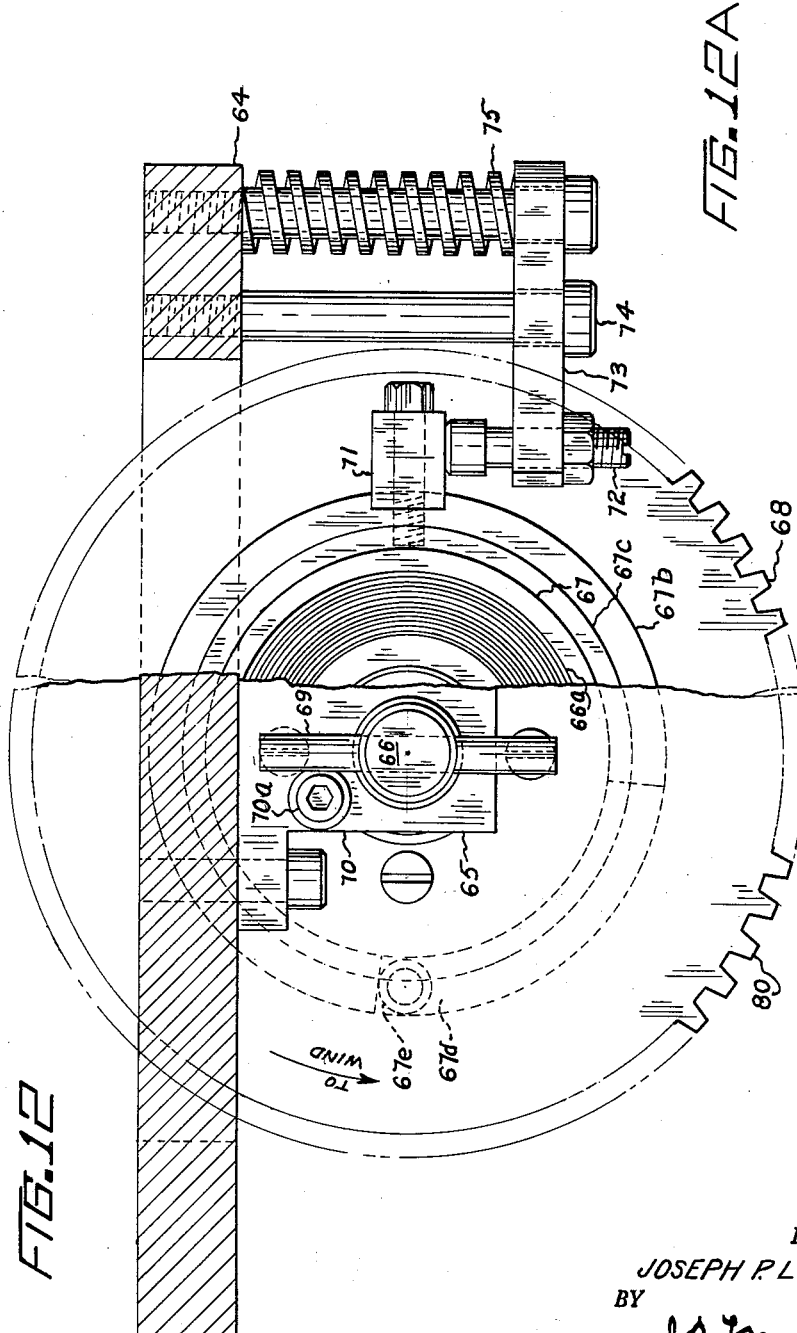
INVENTOR.
JOSEPH P. LANNEN
BY
ATTORNEY June 4, 1963 J. P. LANNEN 3,091,970
AUTOMATIC UNIVERSAL BALANCE TESTING MACHINE
Filed Sept. 22, 1958 18 Sheets-Sheet 11
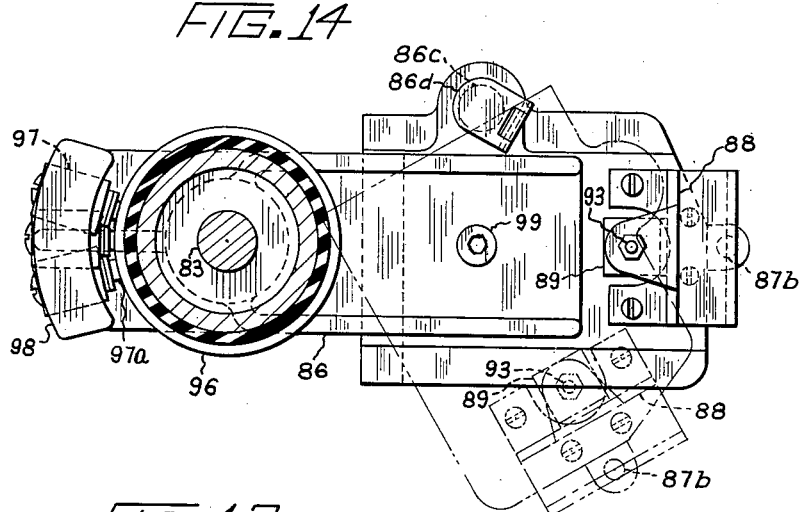
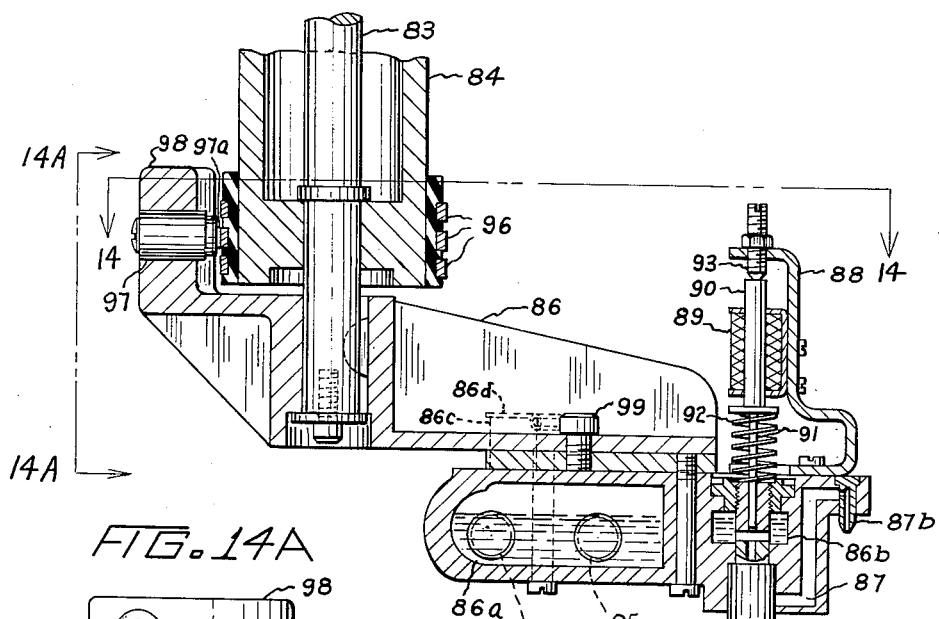
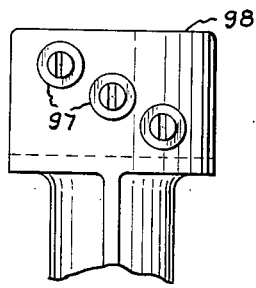
INVENTOR.
JOSEPH P. LANNEN
BY
J.D. Murray
ATTORNEY

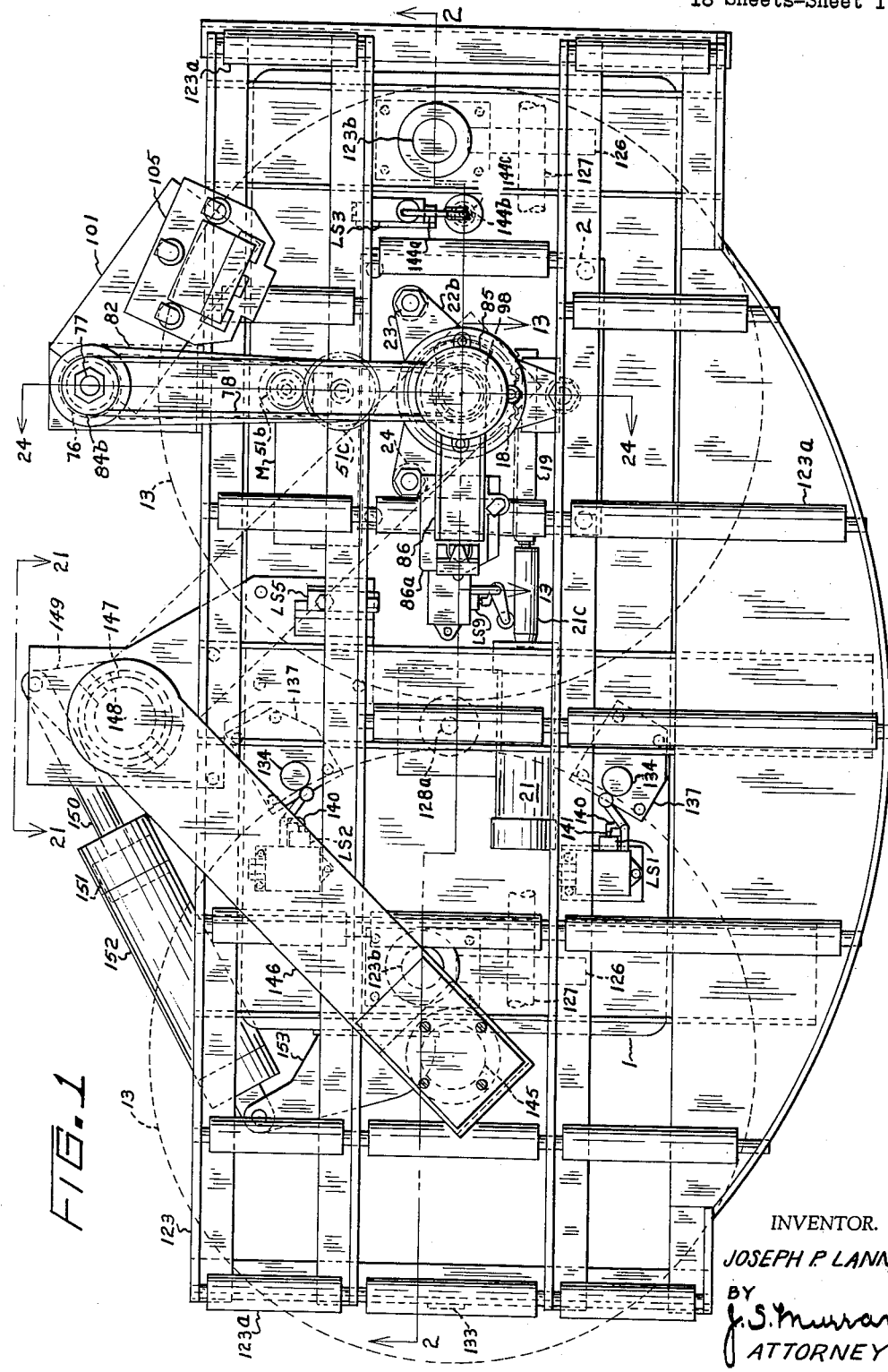

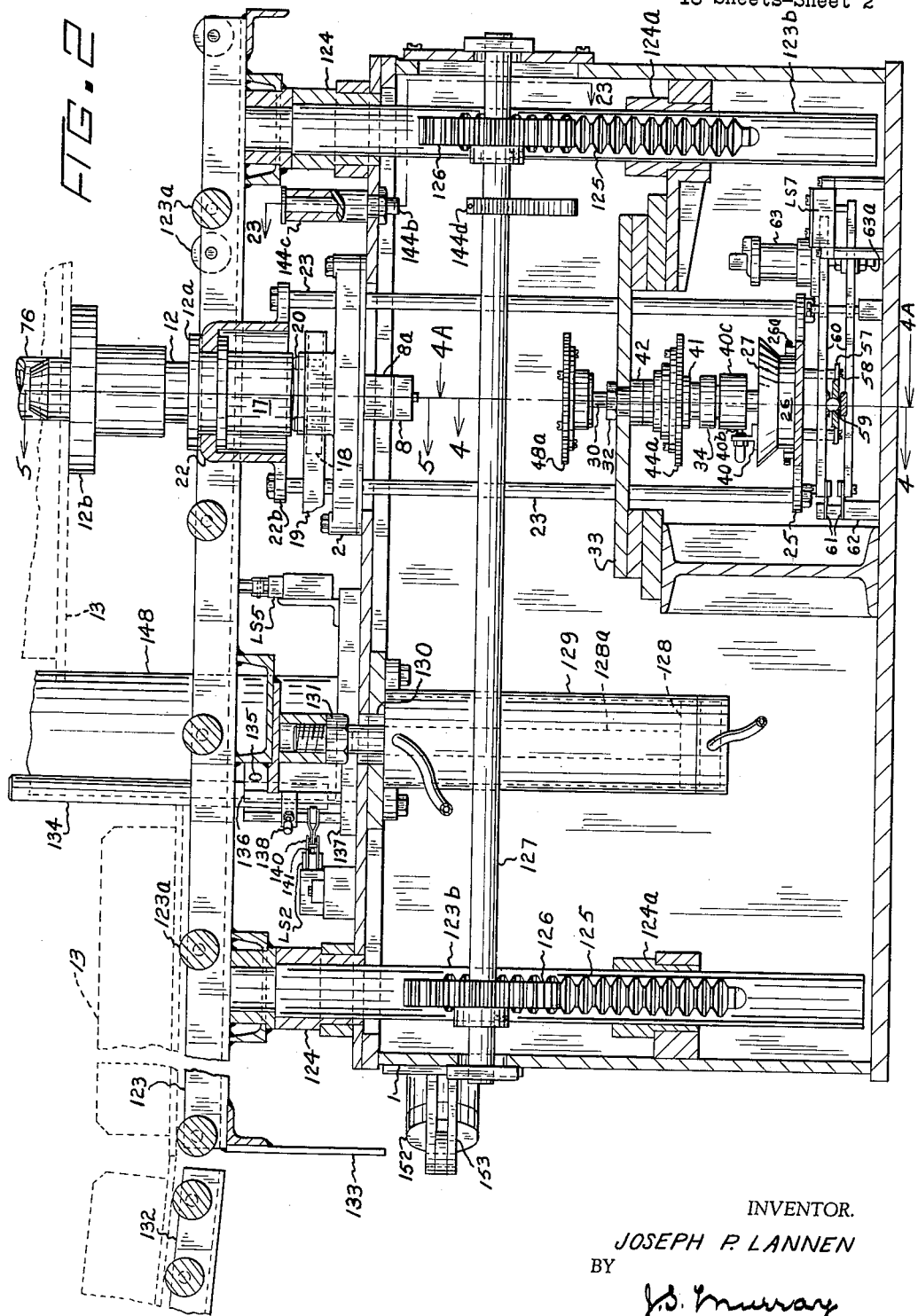

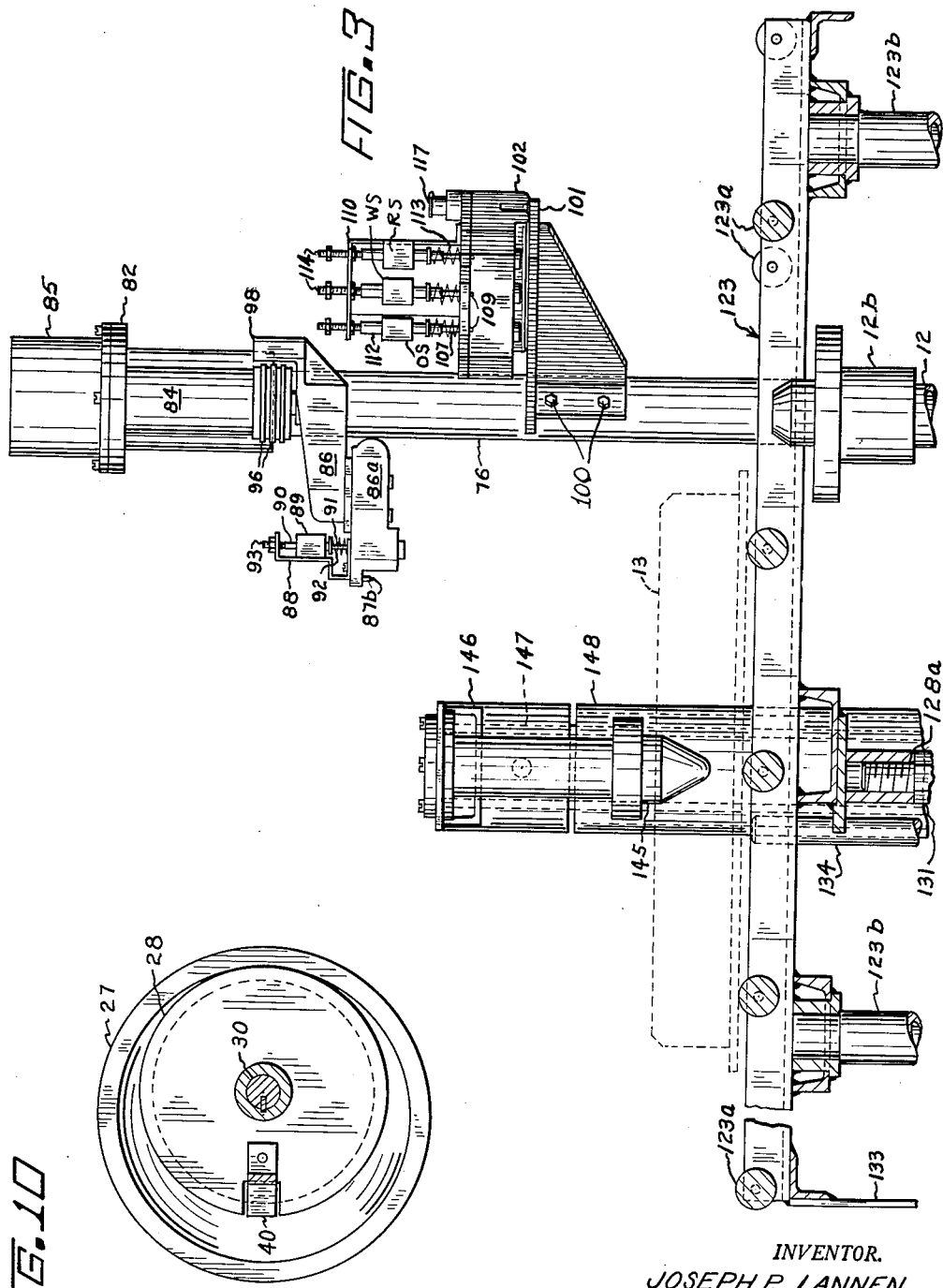

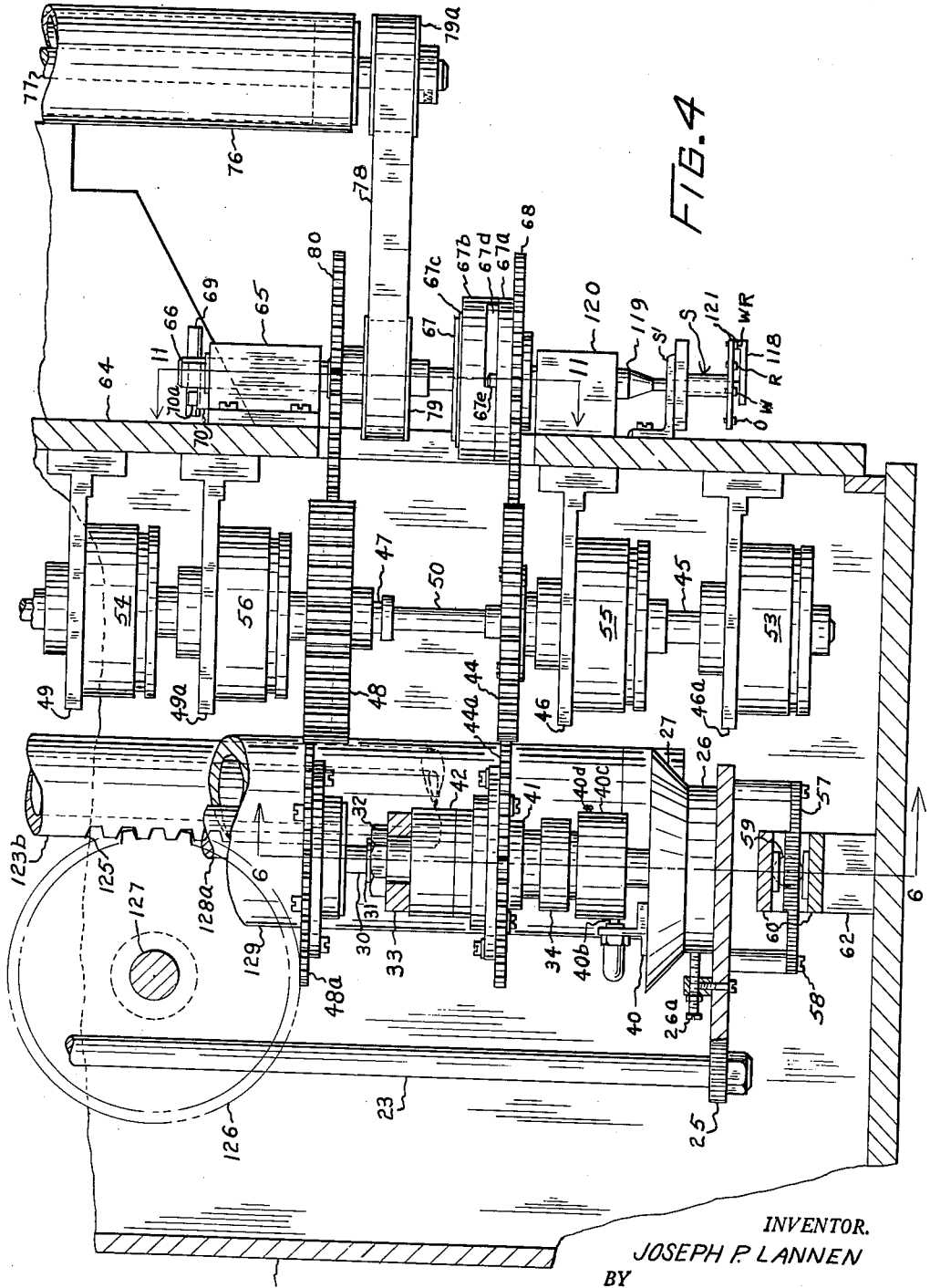

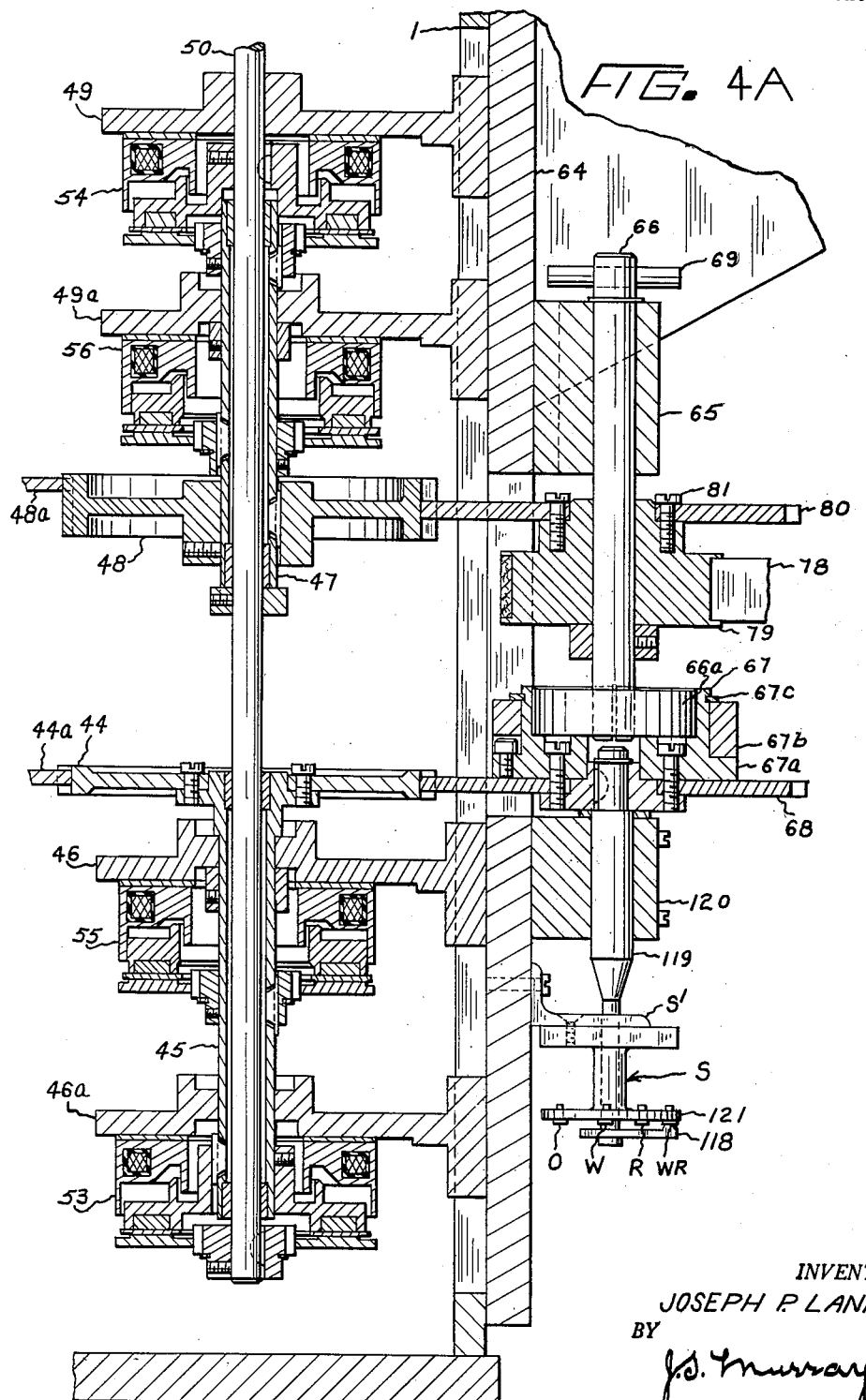

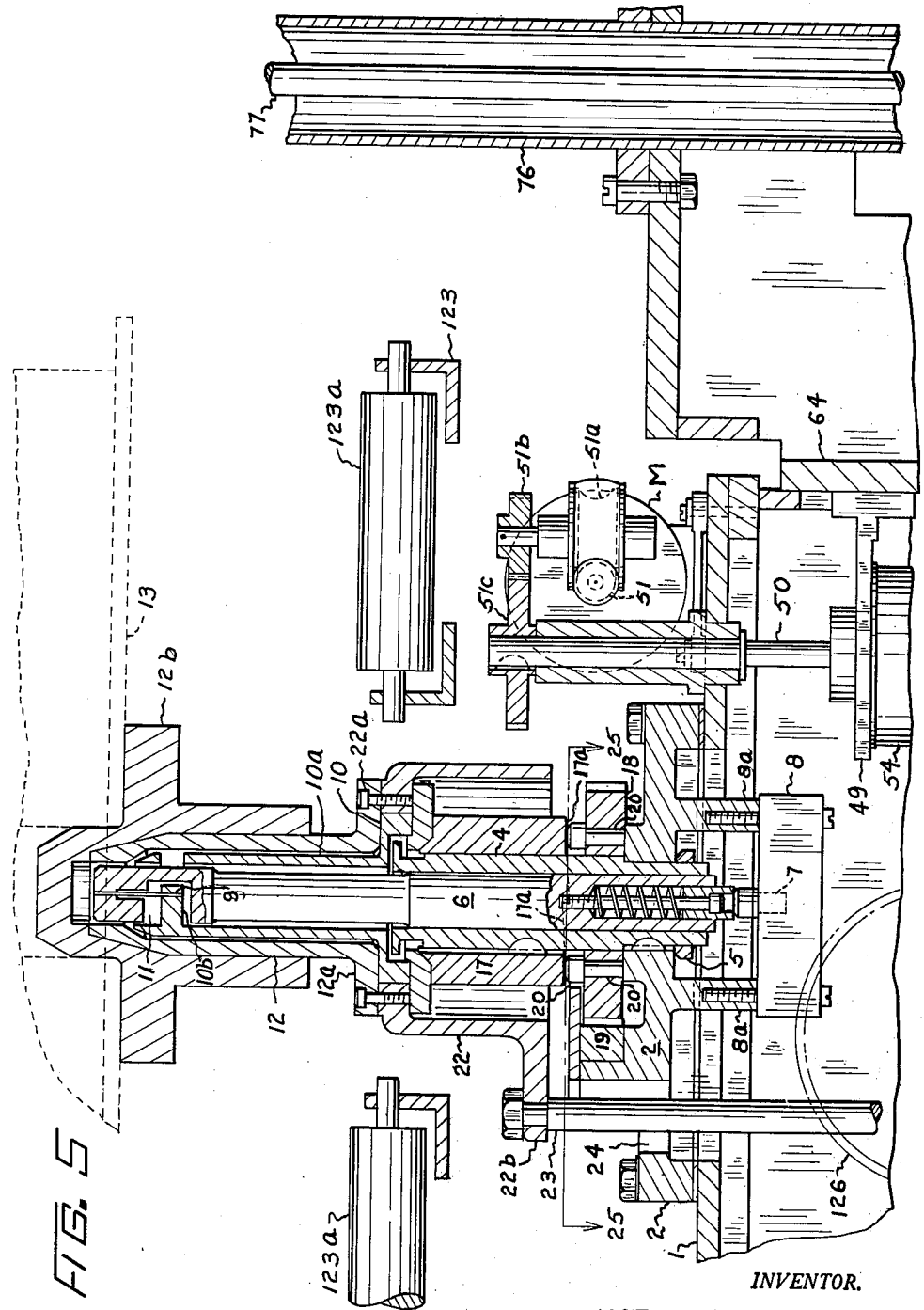

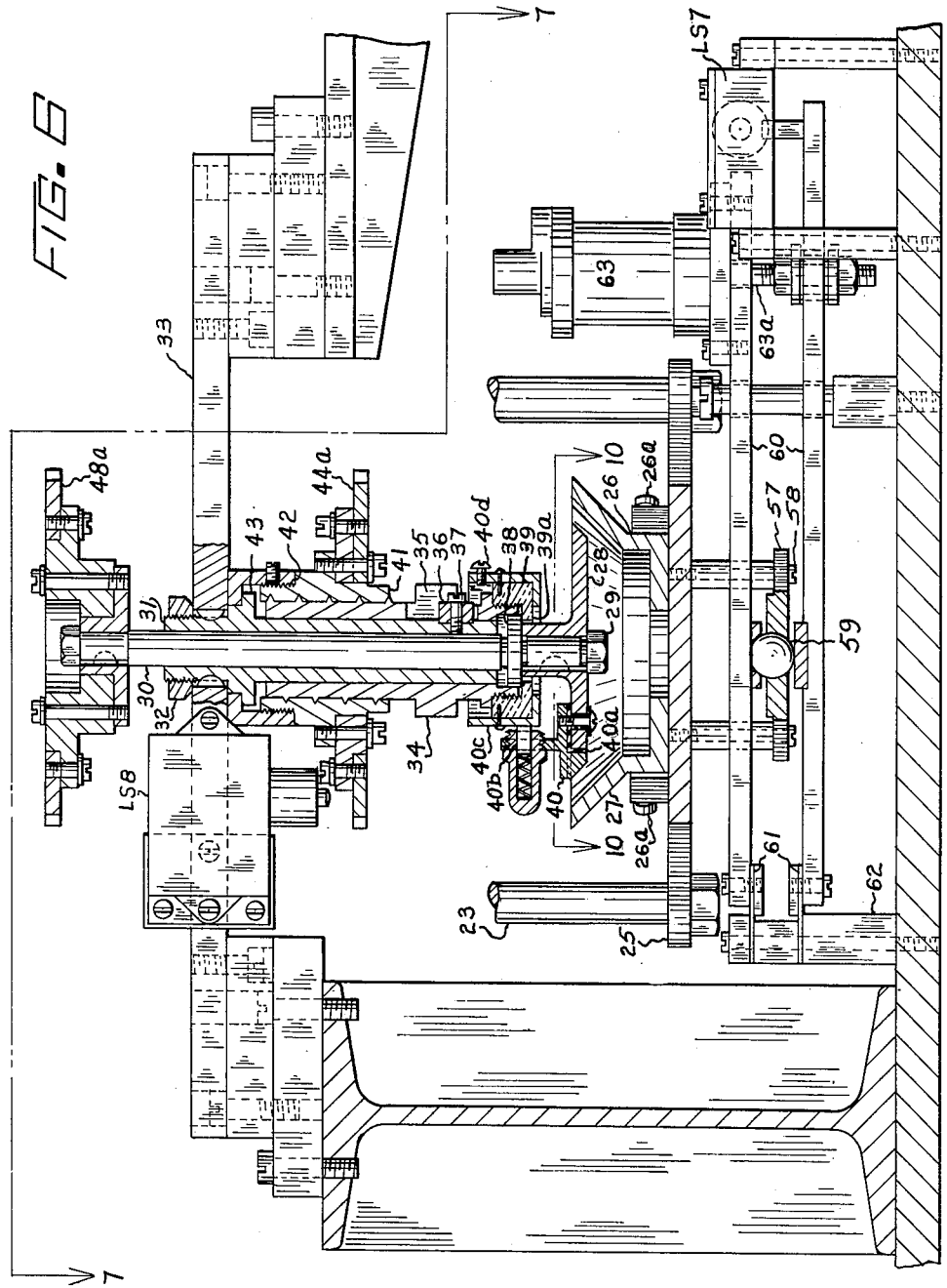

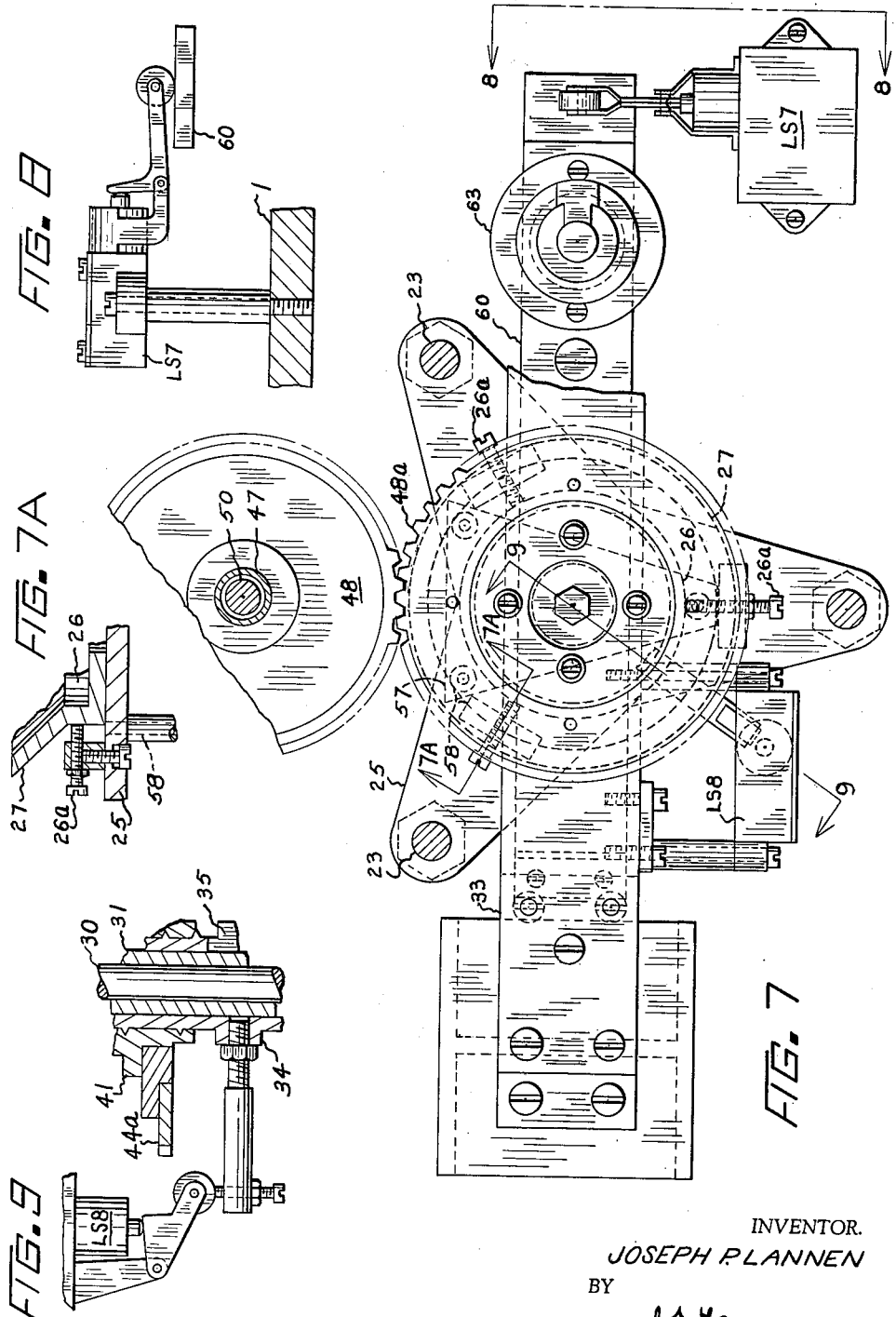

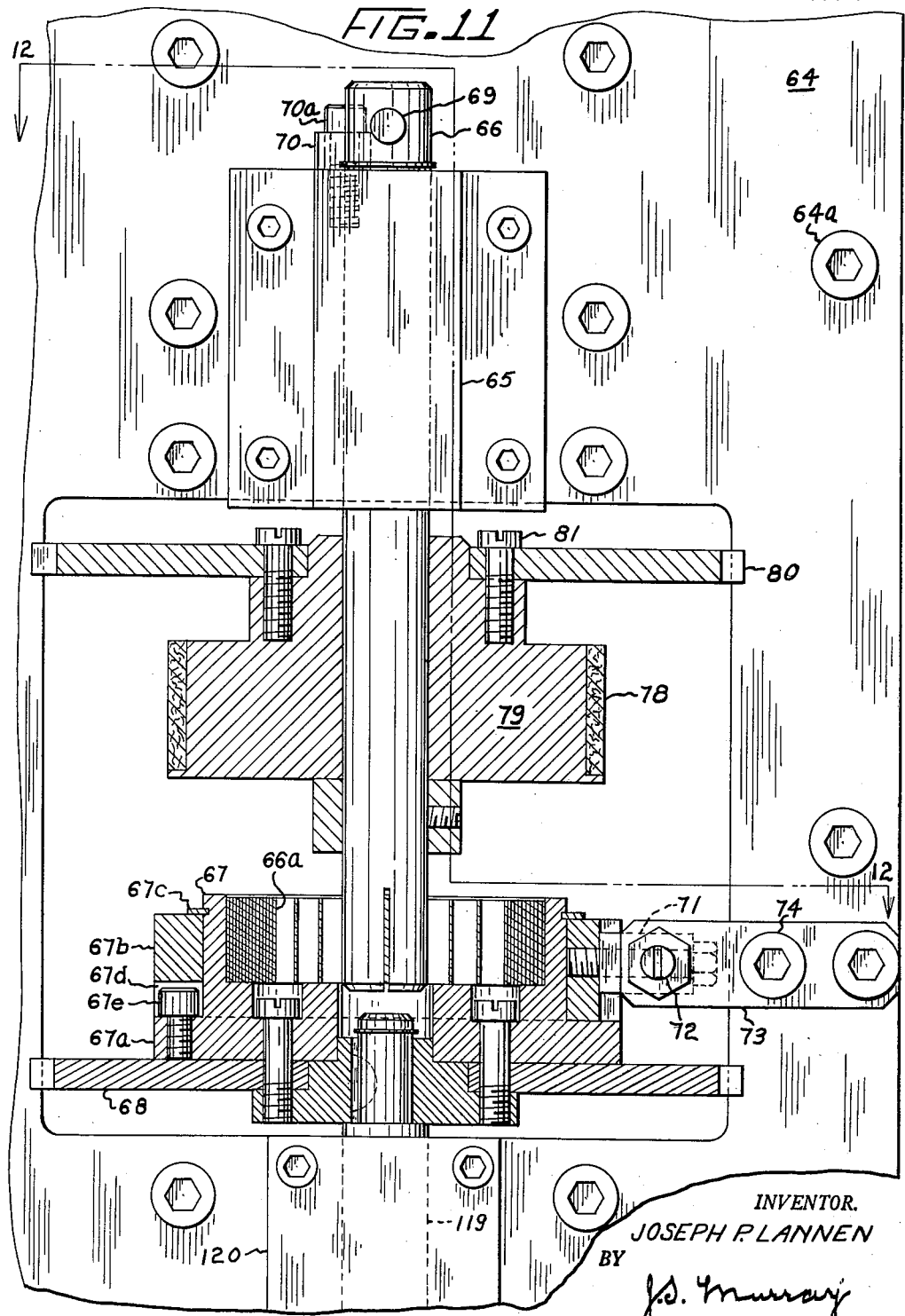

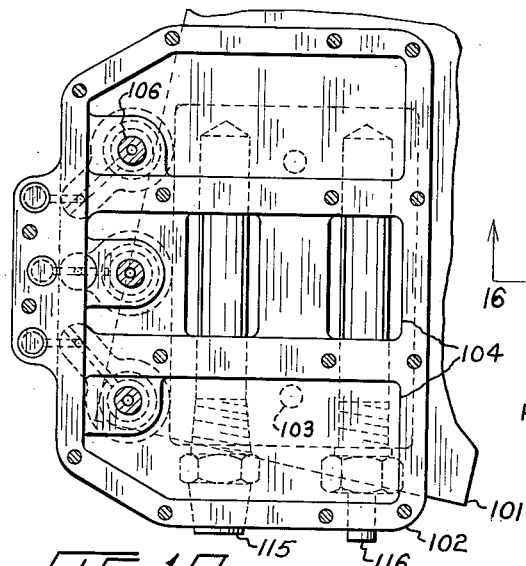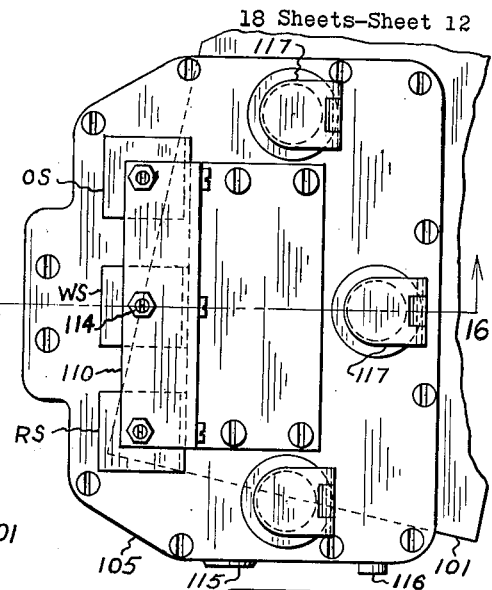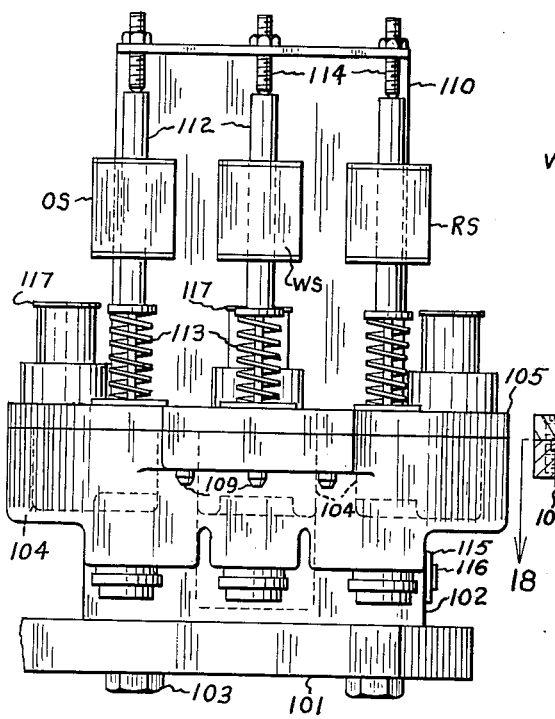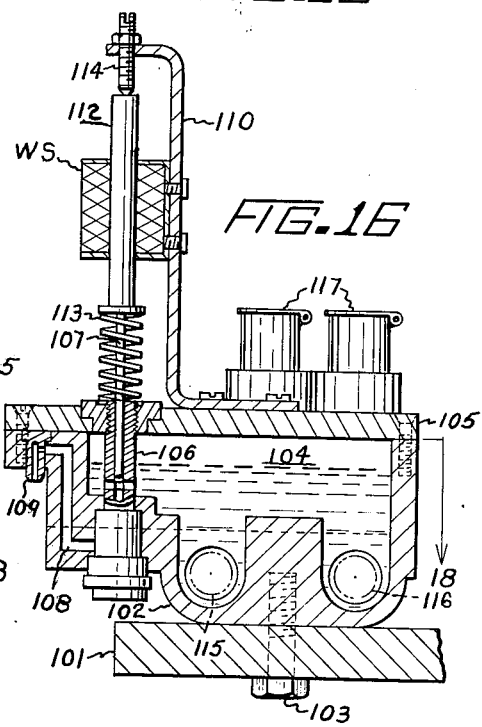

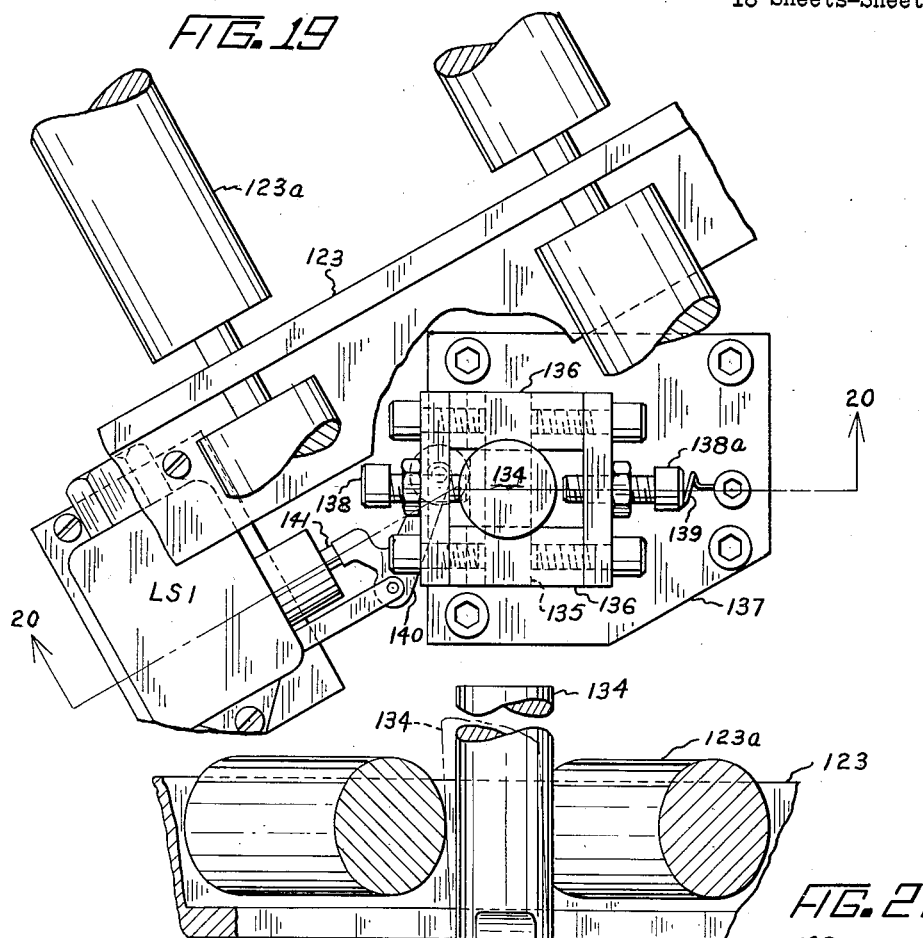
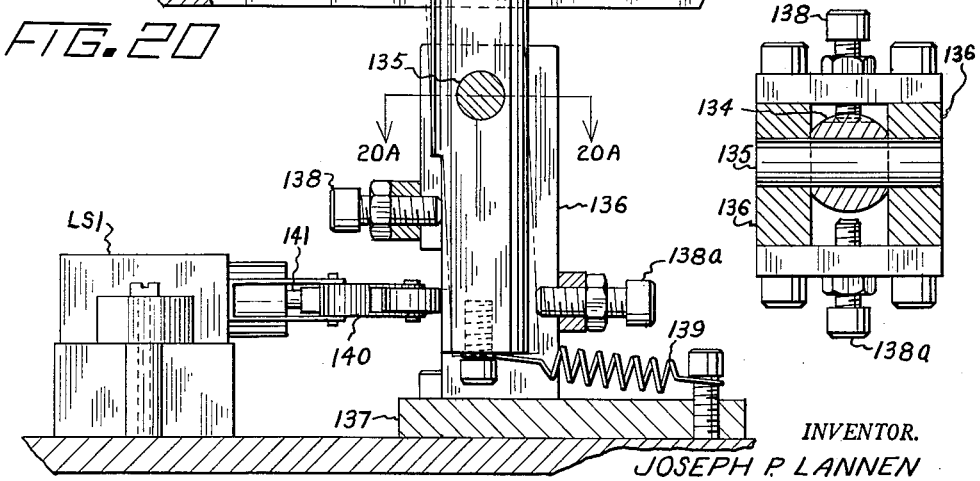

June 4, 1963  J. P. LANNEN  3,091,970
AUTOMATIC UNIVERSAL BALANCE TESTING MACHINE
Filed Sept. 22, 1958  18 Sheets-Sheet 15
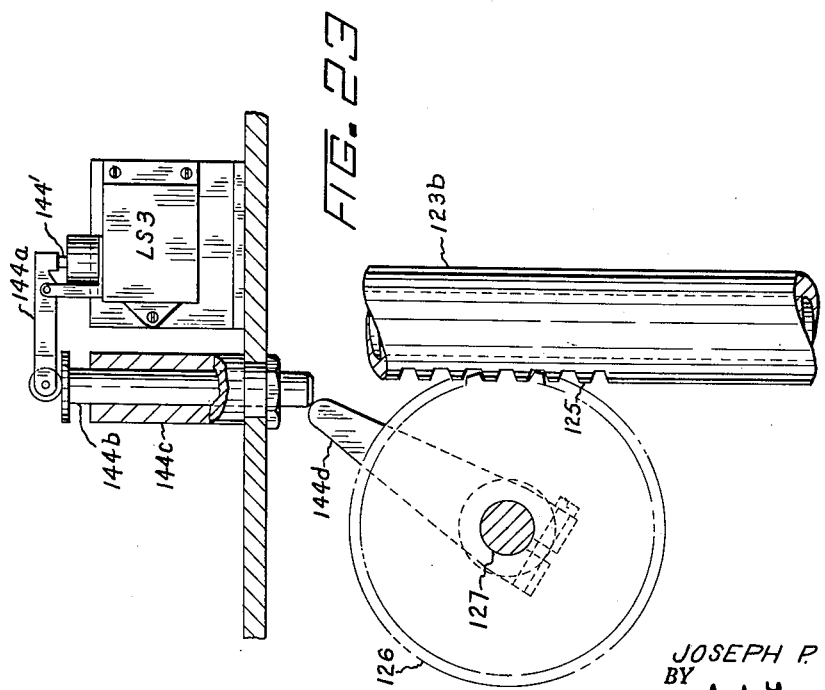
INVENTOR.
JOSEPH P. LANNEN
BY
J.S. Murray
ATTORNEY June 4, 1963  J. P. LANNEN  3,091,970
AUTOMATIC UNIVERSAL BALANCE TESTING MACHINE
Filed Sept. 22, 1958  18 Sheets-Sheet 16
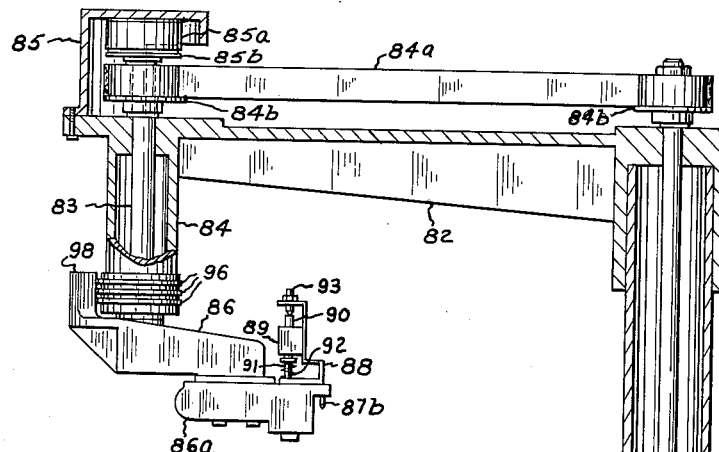
FIG. 24
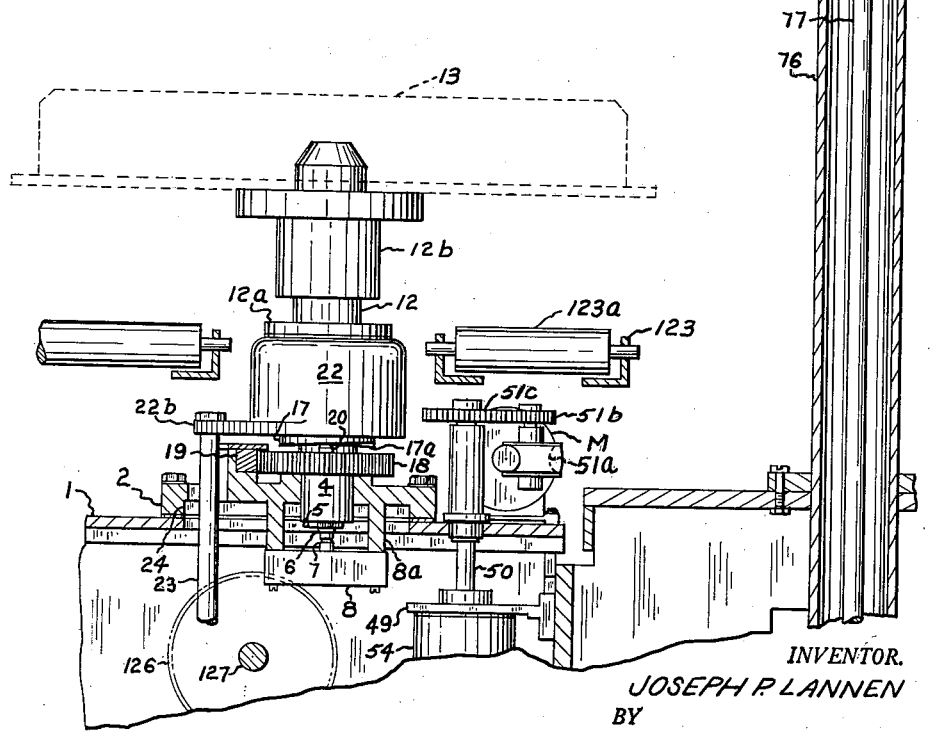
INVENTOR.
JOSEPH P. LANNEN
BY
*J. D. Murray*
ATTORNEY

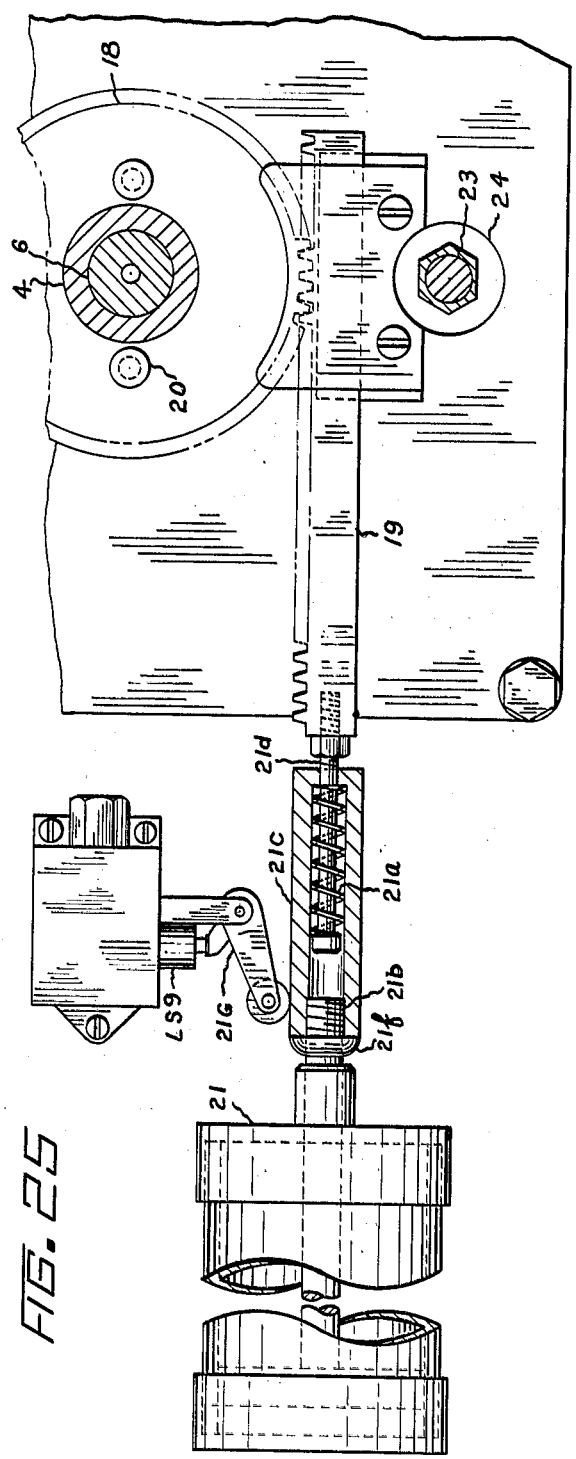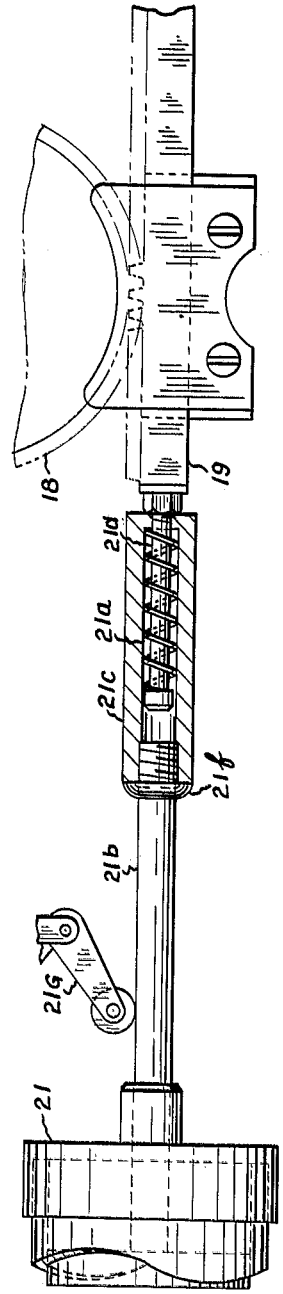
INVENTOR.
JOSEPH P. LANNEN
BY
ATTORNEY

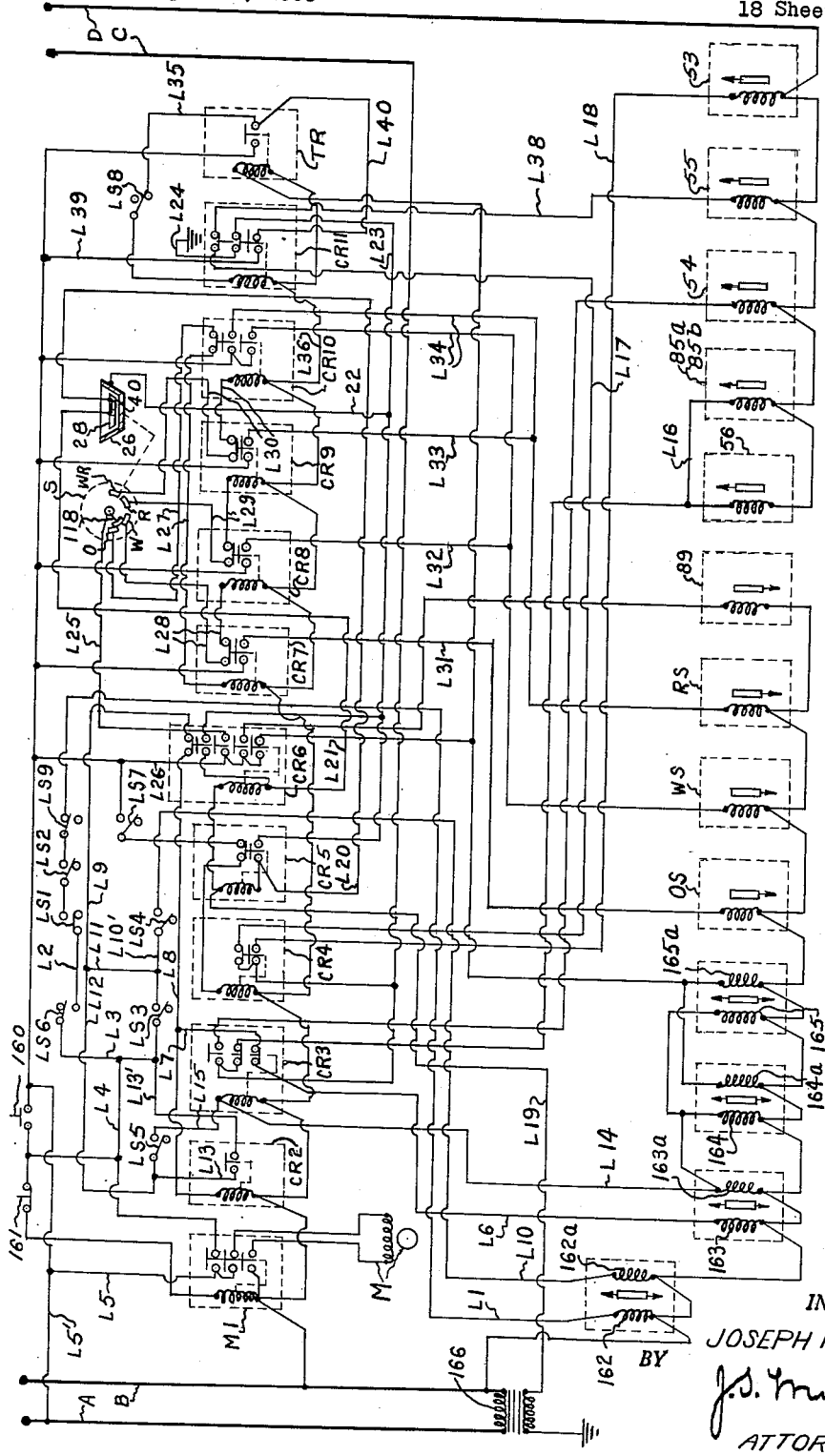

United States Patent Office 3,091,970
Patented June 4, 1963

3,091,970
AUTOMATIC UNIVERSAL BALANCE TESTING MACHINE
Joseph P. Lannen, Detroit, Mich., assignor to Micro-Poise Engineering and Sales Company, Detroit, Mich., a partnership
Filed Sept. 22, 1958, Ser. No. 762,414
8 Claims. (Cl. 73—483)

This invention relates to machines and methods for testing work-pieces as to their universal balance and particularly for determining both the amount of any unbalanced weight and its particular radial location with respect to the vertical axis of a work-piece. The invention may be considered an improvement upon the subject matter of Patent 2,792,725, issued to me May 21, 1957.

In the identified patent, after disposal of a work-piece on a universally pivotal carrier, there may be initiated a cycle of operations including determination of amount and radial direction of unbalance, a rotative actuation of the piece to dispose its concentration of unbalanced weight beneath a cutting tool, and actuation of such tool to the extent requisite to correct unbalance.

An object of the present invention is to adapt work-pieces to be successively and automatically delivered to the pivotal carrier of a testing machine, as the first step of an operating cycle and to be automatically ejected from the machine as the final step of such cycle.

Another object is to adapt the machine to so mark each piece during an operating cycle as to indicate both the amount and radial direction of any unbalance.

Another object is to effect both aforesaid markings in substantial concurrence.

Another object is to automatically mark the pieces, as aforesaid, in a manner affording ready eventual removal of the markings, while avoiding their premature disturbance or accidental removal.

Another object is to employ drops of initially molten wax or the like as a marking medium, such drops immediately cooling, solidifying and adhering, when deposited upon a work-piece.

Another object is to adapt the machine to selectively apply markings of various colors, signifying various amounts of weight which must be applied to or removed from a work-piece to correct an unbalance automatically detected by the machine.

Another object is to equip such a machine with an automatic elevator initially and singly receiving pieces to be tested and serving in an initial uptravel to raise each piece, as received, into engagement by a mechanism for transferring such piece to vertical axial alignment with a pivotal carrier suited to subject the piece to a balance-testing or other operation, the elevator then lowering the piece to a seat on such carrier.

Another object is to adapt the aforementioned transfer mechanism, in shifting a piece from an initial position on the elevator to a final position thereon, to eject a previously tested or otherwise treated piece from the machine.

Another object is to adapt the described elevator, in upward travel, to carry two work-pieces, one of which has just been delivered to the machine, the other having been tested or otherwise treated upon the aforementioned carrier.

Another object is to provide a pair of coacting control heads for gauging the amount and indicating the radial direction of unbalance of work-piece, and to provide in an improved manner for effecting and controlling a relative travel of such heads.

Another object is to so automatically control the balance-testing mechanism, elevator-operating mechanism, and work-marking mechanism that a required sequence and timing will be established between their operations.

These and various other objects are attained by the method and construction hereinafter described and illustrated in the accompanying drawings, wherein:

FIG. 1 is a top plan view of the complete machine, indicating two circular work-pieces in dash lines.

FIG. 2 is a longitudinal vertical section taken on the line 2—2 of FIG. 1, the elevator being in its lower position.

FIG. 3 is an upward continuation of FIG. 2, showing the elevator in its raised position, with a work-piece in a partially advanced position on the elevator, the transfer arm being swung midway between its two positions shown in FIG. 1.

FIG. 4 is a vertical section of the lower portion of the machine taken transversely thereof on the line 4—4 of FIG. 2.

FIG. 4A is a fragmentary section taken approximately on the line 4A—4A of FIG. 2, showing to a larger scale and in more complete section a portion of the mechanism appearing in FIG. 4.

FIG. 5 is a fragmentary vertical section taken on the line 5—5 of FIG. 2, and particularly showing a universally pivoted work carrier.

FIG. 6 is a vertical section on the line 6—6 of FIG. 4, particularly showing a pair of coacting control heads for gauging work unbalance.

FIG. 7 is a top plan view of the same, taken on the line 7—7 of FIG. 6.

FIG. 7A is a fragmentary vertical section taken on the line 7A—7A of FIG. 7 and particularly showing one of several adjusting screws for a control head.

FIG. 8 is a fragmentary vertical section on the line 8—8 of FIG. 7, showing control means for a limit switch.

FIG. 9 is a fragmentary vertical section on the line 9—9 of FIG. 7 and showing another limit switch and its control means.

FIG. 10 is a horizontal section on the line 10—10 of FIG. 6, showing a mutually tangential relation of a pair of control heads, which in FIG. 6 appear in a coaxial relation.

FIG. 11 is a fragmentary vertical section on the line 11—11 of FIG. 4, primarily showing a spiral spring and means for winding such spring and regulating its stress.

FIG. 12 is a top plan view of said spring and its controls, taken on the line 12—12 of FIG. 11.

FIG. 12A is an elevational detail view of a bumper-mounting ring appearing in FIGS. 11 and 12.

FIG. 13 is a vertical sectional view on the line 13—13 of FIG. 1, showing a rotary wax-dispensing device for marking a work-piece to indicate its radial direction of unbalance.

FIG. 14 is a horizontal sectional view of such device, taken on the line 14—14 of FIG. 13.

FIG. 14A is a fragmentary elevational view of said device taken on the line 14A—14A of FIG. 13.

FIG. 15 enlarges a portion of FIG. 1 and is a top plan view of a wax-dispensing device for marking work to indicate its amount of unbalance, if any.

FIG. 16 is a vertical sectional view of said indicator, taken on the line 16—16 of FIG. 15.

FIG. 17 is a front elevational view of the same indicator.

FIG. 18 is a horizontal sectional view of said indicator, taken on the line 18—18 of FIG. 16.

FIG. 19 is a fragmentary enlargement of a portion of FIG. 1, showing a limit switch and means for controlling such switch responsive to loading of a work-piece on the elevator.

FIG. 20 is a sectional elevation of such switch and control means, taken on the line 20—20 of FIG. 19.

FIG. 20A is a cross-section of said means, taken on the line 20A—20A of FIG. 20.

Figure 21:
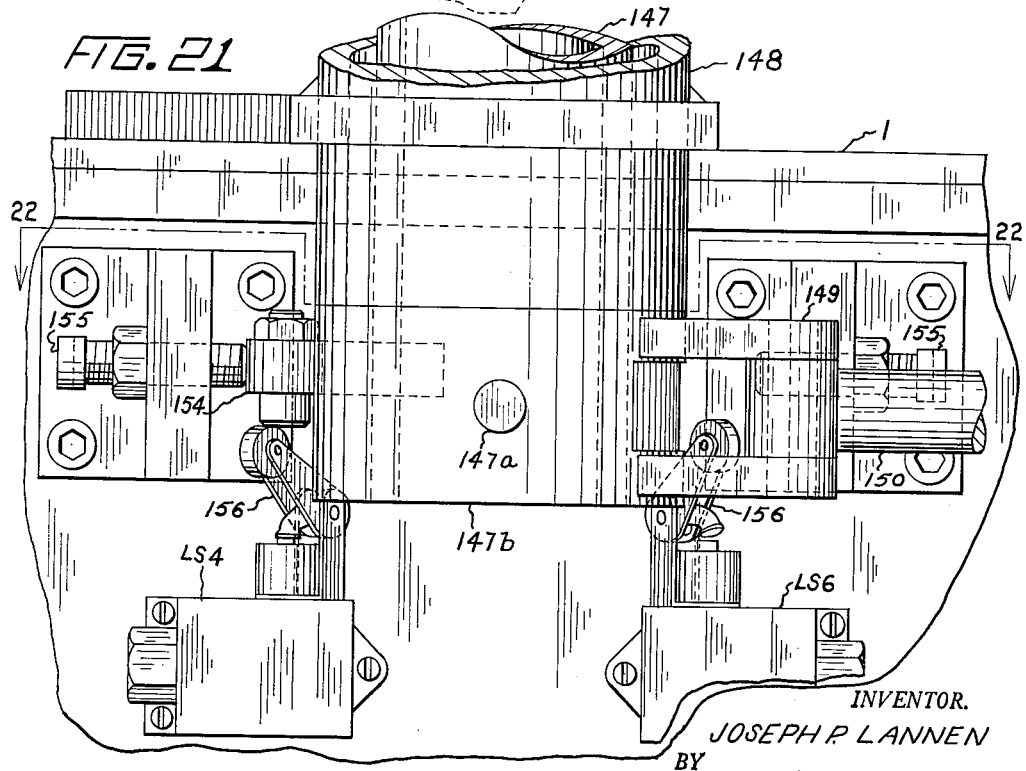

FIG. 21 is a fragmentary elevational view on the line 21—21 of FIG. 1, showing the control of two limit switches by a vertical rock-shaft, and means for rocking such shaft.

Figure 22:
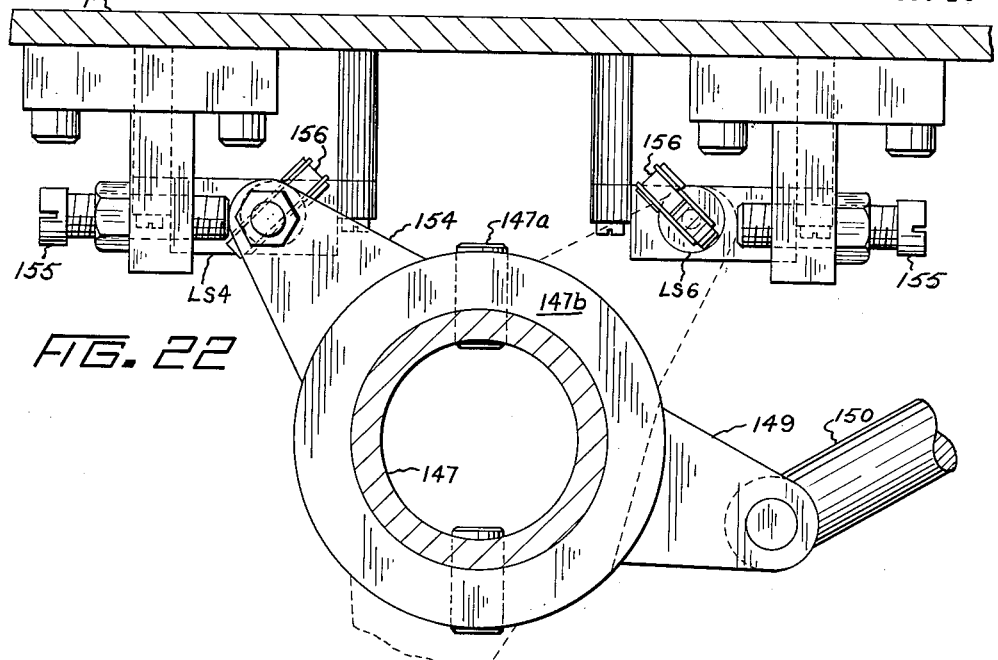

FIG. 22 is a horizontal sectional view of the same, taken on the line 22—22 of FIG. 21.

FIG. 23 is a fragmentary vertical cross section, taken on the line 23—23 of FIG. 2, showing a limit switch and its control mechanism.

FIG. 24 is a vertical sectional view taken on the line 24—24 of FIG. 1 and primarily showing drive means for the aforementioned radius-indicating, wax-ejecting marking device.

FIG. 25 is a cross-section on the line 25—25 of FIG. 5, enlarged to show a rack and pinion drive mechanism.

FIG. 26 is a similar view, in partial section, showing another position of such mechanism.

FIG. 27 is a diagram of electrical features of the machine.

*Work Carrier and Its Universal Pivot (FIG. 5)*

Surmounting the hollow base 1 of the machine is a plate 2 welded or otherwise rigidly secured to such base. Upstanding from such plate is a tubular post 4 clamped to the plate by a nut 5. Slidably fitted in and projecting above the post is a pin 6 seated at its lower end on the head of an adjusting screw 7 threaded in a plate 8 carried within the base on lugs 8a rigidly depending from the plate 2. Set into the top portion of the pin 6 is a short vertical length of flexible wire 9 forming a universal pivot. The upper end of such wire is rigidly carried by and at the axis of said pin, and its lower end centrally mounts and suspends a work carrier 10 whose upstanding tubular hub 10a has an interior lug 10b affixed to said wire. The hub 10a has adequate annular clearance from the pin to afford a requisite slight tilting of the carrier, and the pin has a slot 11 opening in its periphery to adequately clear the free portion of said wire and accommodate and afford working clearance to the lug 10b. A sleeve 12 concentrically encloses the hub 10a, and has a flange 12a resting on the carrier 10. An adapter 12b is carried by the sleeve 12, and a work-piece 13 may be slip-fitted on the adapter for balance testing purposes. A universal pivot of the type above described is disclosed in greater detail in my Patent 2,349,288, issued May 23, 1944.

*Relief Provision for Universal Pivot (FIGS. 5, 25, 26)*

When a work-piece is being applied to or removed from the described carrier, it is highly desirable to safeguard the pivot wire 9 from consequent stresses which might otherwise damage or break such wire. For this purpose, a sleeve 17 is slidably fitted on the post 4 and is afforded a slight up or down actuation responsive to rotation of a pinion 18 journaled on said post and seated on the plate 2. Such pinion may be driven by a rack-bar 19 and carries a pair of upstanding headed pins 20. The lower end face of the sleeve has duplicate helical cam inclinations 17a seated on the heads of said pins, whereby a partial revolution of the pinion will slightly raise or lower the sleeve. In raised position, the sleeve slightly elevates the carrier 10 and thus relieves the universal pivot. When lowered, the sleeve sufficiently clears the carrier to afford the latter a slight requisite tilting about the universal pivot. The rack-bar 19 derives its sliding actuation from a fluid motor 21 of piston and cylinder type.

Referring now particularly to FIGS. 25 and 26, it is preferred to interpose a coiled spring 21a between the rack-bar 19 and a piston rod 21b included in said fluid motor, such rod having an extension 21c forming a tubular housing for the spring. The rack rigidly carries a bolt 21d extending centrally into and headed within the housing 21c, and the spring reacts between the head of such bolt and the housing end adjoined to the rack-bar. When the piston rod is driven to the right (FIGS. 25 and 26), its travel is imparted to the rack-bar by the housing 21c, the spring maintains its expansion, and the resultant rotation of the pinion 18 serves to lower the sliding sleeve 17. When the drive is to the left, the spring 21a is somewhat compressed before such drive takes effect on the rack and pinion to raise the sleeve 17. This avoids any undue wedging of the sleeve 17 in its raised position, due to gradual inclination of the cam faces 17a, since the spring 21a will undergo a slight further compression in preference to wedging the pins 20 against the raised sleeve.

A limit switch LS9 surmounts the base 1 in proximity to the spring housing 21c and is controlled by a bell crank 21g whose power arm bears on siad spring housing. An annular cam 21f fixed on the piston rod 21b is adapted to effect upward or downward rocking of said bell crank according as said housing is driven to the left (FIG. 25) or right (FIG. 26). This results in opening or closing the switch LS9 according as the sleeve 17 is raised or lowered. The function of the switch LS9 is hereinafter explained.

*Tilting Control Head (FIG. 6)*

Rigidly secured, as by screws 22a, to and beneath the flange 12a of the sleeve 12, is the inverted hub 22 of a spider having three, or some other plurality of projections 22b normally occupying a horizontal plane, and rigidly mounting parallel downwardly extending rods 23, equidistant from the vertical axis established by the universal pivot 9 when said carrier is in balance. Said rods extend freely through openings 24 in the plate 2 and are thus afforded such swinging as is induced by tilting of the carrier. The rods 23 terminate in the lower portion of the base and have their lower ends rigidly interconnected by a normally horizontal spider 25. Rigidly and centrally surmounting such spider, is a hollow metallic control head 26 having an inverted frusto-conical upper portion 27. The interior chamber of such head opens upwardly through and conforms to the upward flare of such portion.

It will now be evident that the carrier 10, spider 22, 22b, rods 23, spider 25, and head 26 jointly form a vertically elongated balancing unit, and that an axis of equilibrium for such unit is established by the universal pivot 9, and that such axis may diverge from the fixed vertical pivot axis proportionately and responsive to any tilting of the work carrier 10. It is essential to accurately center the head 26 at said axis of equilibrium of the balancing unit. By means of three set screws 26a, installed upon the spider and adjustable along radii of said head, the latter may be adjusted in any lateral direction to assure its desired centering.

*Sliding Rotary Control Head (FIG. 6)*

Coacting with the head 26, within and normally upwardly spaced from the latter, is a smaller metallic head 28, having an inverted frusto-conical periphery, inclined in parallelism with the flared inner face of the head 26, when the two heads are coaxial. To adapt the head 28 for travel along the fixed vertical axis determined by the universal pivot 9, such head is rigidly held by a nut 29 on the lower end of an upright shaft 30, slidable and rotatable within a vertically elongated bearing 31. The latter is rigidly clamped at its upper end by a nut 32 to a cross-bar 33 suitably fixed within the base 1.

Slidable up and down on the bearing 31 is a sleeve 34 formed with a coarse exterior screw thread and having a vertically elongate slot 35. A roller 36 journaled on a pin 37 radially projecting from the bearing 31 is so fitted in the slot 35 as to prevent rotation of said sleeve, while affording the latter its intended up and down travel. An annular flange 38 rigidly carried by the shaft 30 is set into a recess in the lower end of the sleeve 34 and is retained in such recess by a flange 39a interiorly formed on an insulating collar 39 threaded on the sleeve. This permits a rotation of the shaft 30 independent of the sleeve, while requiring the shaft to participate in sliding travel of the sleeve. The head 28 has its periphery radially notched to receive and rigidly mount a contact element 40 flush with the rim of such head and insulated from such head, as indicated at 40a. Said element mounts a spring-pressed brush 40b bearing radially against a collector ring 40c fixed upon and coaxial with the collar 39. A binding screw 40d on the ring 40c serves to connect the latter in an electric circuit hereinafter described.

*Drive Mechanisms for Sliding Rotary Head (FIGS. 4 to 6)*

A feed-nut 51 for effecting up and down travel of the sleeve 34 is rotative on the upper portion of such sleeve, meshing with the aforementioned coarse thread of the latter. An annularly flanged collar 42 fixed on the upper end of said nut is correlated with an annular flange 43 on the bearing 31 to restrain the nut from up or down travel. A pair of intermeshed gears 44 and 44a are adapted to transmit rotation to the feed-nut from a tubular vertical shaft 45 journaled in a pair of vertically spaced brackets 46 and 46a fixed on a wall of the base. Aligned with and upwardly spaced from the shaft 45 is a second tubular shaft 47 from which a gear train 48, 48a may transmit rotation to the upper end of the shaft 30. The shaft 47 is journaled in a pair of vertically spaced brackets 49 and 49a fixed on said wall of the base. Rotatable within the shafts 45 and 47 is a shaft 50 having an end portion projecting above the base to be driven through a speed-reducing gear train 51, 51a, 51b and 51c from an electric motor M (FIG. 5) surmounting the base.

For reasons hereinafter appearing, it is necessary at various times to make or break the drive connections from the shaft 50 to the tubular shafts, and rotation of the latter must cease instantly when the drive thereto is discontinued. To accomplish such control, electromagnetic friction clutches 53 and 54 serve respectively to transmit rotation to the respective shafts 45 and 47, and electromagnetic brakes 55 and 56 coact respectively with the brackets 46 and 49a to abruptly stop rotation of either tubular shaft, when desired (FIG. 4A). Clutches and brakes responsive to electric control and thus suited to the aforementioned purpose are well known and readily available. Preferably the feed-nut 41, shaft 30, and shaft 50 are all driven at the same speed. Automatic controls for said clutches and brakes are hereinafter described.

*Clamp To Maintain Deflection of Balancing Unit (FIG. 6)*

When the universal pivot 9 is under load of a workpiece 13 applied to the carrier 10, the latter may tilt together with the balancing unit including such carrier, the direction and degree of such tilting being determined by any unbalance of such piece. In case the latter is in perfect balance, no tilting will occur. The tilted position of said unit must be accurately maintained during certain subsequent operations hereinafter explained, and there will now be described a provision for firmly clamping and thus immobilizing the unit in said position. Downwardly spaced from the spider 25 is a clamping element 57 rigidly mounted on the spider by bolts 58. Said element centrally and rigidly carries a ball 59, preferably steel, having opposed portions similarly projecting above and below such element. Extending across said element above and below the ball 59, are a pair of vertically spaced clamping levers 60 having corresponding ends thereof mounted by plates 61 on a block 62 rigidly upstanding from the floor of the base 1. Said plates have a resilient flexibility adequate to fulcrum the levers for a slight swinging travel to and from each other. The end portions of the levers remote from their fulcrums respectively carry the cylinder 63 and piston rod 63a of a fluid motor. Fluid delivery to and from such motor is hereinafter explained. The motor serves to alternatively clamp the ball 59 firmly between the levers, or to relieve the ball of clamping pressure. The described arrangement permits the levers to exercise their function equally well in any permitted tilting position of the balancing unit.

*Spring Means for Reversing Sliding Drive to Rotary Control Head (FIGS. 11 and 12)*

Upon the rear wall of the base 1 there is rigidly exteriorly mounted by bolts 64a a vertical plate 64 carrying a bearing 65 wherein is journaled the winding stem 66 of a spiral spring 66a. The latter is mounted preferably on the lower end of the stem, being secured at its inner end to the stem. The spring is set into a housing 67 and secured at its outer end to such housing. A gear 68 bolted to the housing is meshed with the gear 44, whereby the tubular shaft 45 is adapted to alternatively drive the housing 67 to wind said spring or to be driven by the latter, as it unwinds. The stem 66 projects slightly above the bearing 65 to mount a cross-pin 69 engageable with a collar 70 secured by a screw 70a fixed in and upstanding from the bearing 65, thus avoiding spring-induced rotation of the stem. The spring torque may be regulated by manually rotating the stem one or more turns prior to inserting the screw 70a in the bearing 65. Also, said cross-pin serves as a handle in effecting the described rotative adjustment of the stem.

Said housing bears an external annular flange 67a on which is rotatably carried a ring 67b retained thereon by a lock ring 67c. To limit any rotation of the housing 67 induced by unwinding of the spiral spring, a bumper block 71 is bolted to said ring 67b to impact a stop formed by a screw 72 set into and adjustable in one arm of a lever 73 fulcrumed at its mid portion on a headed screw 74 rigidly projecting from the plate 64. Said lever has an opposite arm engaged by a coiled spring 75 compressed between such arm and the plate 64. Thus such spring maintains engagement of the lever with the head of the screw 74, and absorbs the shock imposed by the block 71 in encountering the screw 72.

If said bumper block 71 were mounted directly on the housing 67, rotation of the latter would be limited by contact of said block with the threaded end of the screw 72, to approximately 315 degrees. To increase the permissible degree of such rotation, the ring 67b carries the block 71, and the housing is afforded a rotational movement independent of said ring by formation in the latter of a downwardly opening groove 67d, the ends of which may be centered at the axis of the winding stem. The independent rotational movement of the housing is limited by engagement of said ends by a headed screw 67e set into the housing 67.

Thus, during winding rotation of the spring (see arrow, FIG. 12), the ring 67b may rotate with the housing until the bumper block 71 contacts the threaded end of the screw 72. The housing may then continue to rotate independently of the ring, and could so rotate until the screw 67e engages the remote end surface (as shown in FIG. 12) of the aforesaid groove 67d. Upon reverse rotation induced by the spring, the ring may again rotate with the housing until the bumper block 71 contacts the head of the screw 72, and rotation of the housing 67 will continue until the screw 67e engages an end wall of the groove as is shown in FIG. 12, the impact of such engagement being transmitted to and absorbed by the spring 75.

The described limitation of unwinding travel of the spiral spring 66a is a vital feature, since such travel effects upward return of the head 28 to a normal raised position, which must be quite definite in order that a subsequent downward actuation of such head may accurately gauge the amount of unbalance of a work-piece. It is to be noted that the spring 66a may be considered broadly as a means for storing energy.

*Means for Marking Work To Indicate Radial Direction of Unbalance (FIGS. 13, 14, and 24)*

Rearwardly spaced from the base 1 and mounted thereon is a tubular vertical post 76 in which is centrally journaled a shaft 77, driven through a belt 78 and pulleys 79 and 79a. The pulley 79 has a gear 80 coaxial there-with and secured thereto by bolts 81, the drive unit thus formed being journaled on the stem 66, as best appears in FIG. 11. The gear 80 is meshed with and driven by the gear 48, the latter being fixed upon the tubular shaft 47. On the upper end of the post 76 is rigidly mounted a forwardly projecting hollow arm 82, terminating substantially at the vertical axis of the work carrier 10. At an upward extension of such axis, is disposed a vertical spindle 83 centrally journaled within a tubular housing 84 fixed upon and downwardly extending from the front end of the arm 82. Said spindle is driven from the shaft 77 through a belt 84a and pulleys 84b disposed preferably above the arm 82.

Fixed upon and surmounting the housing 84 is a bracket 85 on which are fixed the non-rotative parts 85a of an electromagnetic brake including correlated parts 85b fixed on and rotative with the spindle 84. It will presently appear how said brake is energized at certain cycle intervals to assure a prompt cessation of spindle rotation.

Fixed on the lower end of the spindle 83 and radially projecting from such spindle is an arm 86 carrying a device for marking a work-piece to indicate the radial direction established by any unbalance of such piece. Such device comprises a reservoir 86a receiving molten wax or some other liquid marking medium, by means of a filler tube 86c having a hinged lid 86d. Said reservoir has a reduced extension 86b from which a quite restricted passage 87 leads to a downwardly directed wax discharge nozzle 87b. Surmounting the reservoir is a pump comprising a bracket 88, a solenoid 89 installed on such bracket and having a vertical plunger core 90, and an elongated piston 91 secured to and depending from said core. A spring 92 normally maintains the illustrated raised position of the piston and core, the latter abutting a stop 93 adjustable on the upper end of the bracket 88. Upon energization of the solenoid, the piston 91 induces a slight flow of molten wax to the nozzle 87b and a discharge from the latter of a single drop of the wax. By adjusting the stop 93 and thus regulating the stroke of the described pump, the size of the ejected drop of wax may be predetermined.

An electric heater 94 is installed in the reservoir 86a to maintain the wax in molten form, and with such heater is associated a temperature-responsive switch 95, assuring a desired temperature range. To maintain the circuits of the solenoid 89, heater 94, and switch 95 despite angular actuation of the arm 86 by the spindle 83, three collector rings 96 are fixed on the lower end of the housing 84 and are engaged by brushes 97a disposed in holders 97 installed in a lug 98 upstanding from said arm. Two of said brushes with the rings engaged thereby serve respectively to maintain the solenoid and heater circuits, and the third brush and corresponding ring are included in both such circuits. The described marking device is clamped to the arm 86 by a screw 99 which affords a pivotal adjustment of such device and consequent selectivity of the distance from the spindle 83 to the nozzle 87b. Thus wax discharged from the nozzle can be deposited on a work-piece at selective distances from the axis of the piece, since such axis is aligned with the spindle 83.

The principle of operation of the described marking device imposes certain requirements as follows. The velocity of rotation applied to the control head 28 during testing of a work-piece must be equal to the velocity of a concurrent rotation applied to the arm 86. The radius determined by the contact element 40 with respect to the shaft 30 must be parallel to the radius determined by the nozzle 87b with respect to the spindle 83. Parallelism of said radii, if established in any position of said rotating parts, will of course be maintained in all angular positions, since said parts have the same angular velocity. The solenoid 89 must be energized at the moment that the contact 40 on the head 28 encounters the head 26, since the point of tangency of the two heads will then be on a radius parallel to the radius of unbalance of the work under test. It will hereinafter appear how rotation of the head 28 automatically ceases responsive to engagement of the head 26 by the contact 40.

*Means for Marking Work to Indicate Its Moment of Unbalance (FIGS. 15–18)*

Clamped by bolts 100 on the post 76 (see FIG. 3) is an arm 101 carrying a device for so marking a work-piece as to indicate the moment, preferably in inch-ounces, of any unbalanced weight incorporated in such piece. Such device, as best appears in FIGS. 15–18, comprises a reservoir 102 surmounting said arm and bolted to the latter at 103. Upwardly opening in such reservoir are three chambers 104 for receiving molten wax, the colors of such wax in the several chambers differing materially. A cover plate 105 applied to the described reservoir prevents access of dust or the like to the several chambers. Vertically set into each chamber is the barrel 106 of a pump wherein an elongated piston 107 operates to effect, on its down stroke, a quite small displacement of wax through a passage 108 to a downwardly directed nozzle 109. A bracket 110 surmounting the cover 105 mounts three pump actuators, which are preferably solenoids OS, WS and RS, having plunger cores 112 respectively aligned with and secured to the respective pistons. Each core is upwardly urged by a coiled spring 113 and is limited in its up travel by a stop-screw 114 adjustable on the upper end of the bracket 110. An electric heater 115 is set into the reservoir 102 beneath the chambers 104 thereof, maintaining the wax suitably molten, the circuit of such heater being preferably controlled by a thermostatic switch 116 installed in the reservoir. The plate 105 carries upstanding filling tubes, one associated with each chamber, and such tubes are normally closed by hinged lids 117.

The described marking device is adapted to eject from any of the three nozzles 109 a single drop of wax when the corresponding pump is operated by its solenoid, and the size of such drop may be predetermined by regulation of the stop-screw 114. Said device is so upwardly spaced from the work carrier 10 that ejected drops will fall upon a work-piece on such carrier, adhering quite firmly to such piece as they are instantly cooled by the latter. By unclamping the arm 101 and swinging such arm about the post 76, the particular work area receiving the drops may be somewhat varied to suit different types and sizes of work. However, the indications afforded by the drops depend entirely on their colors rather than any specific location on the work. In depositing single drops on the work, the three available colors may each indicate a different inch-ounce amount of unbalance. By depositing two drops differing in color, three more different weight indications may be had. Numerous further indications may be provided by depositing three drops in the various color combinations thus afforded.

*Automatic Control of Amount-Indicating Marking Device*

Exteriorly installed on the base 1 at its rear, is an automatic switch S (FIG. 4A) mounted on a bracket S' and comprising a rotary wiper arm 118 fixed on a vertical shaft 119, keyed to the spring-winding gear 68. Said shaft is journaled in a bearing 120 fixed on the plate 64. A disk 121 fixed on said switch and of an insulating nature carries an arcuate series of spaced contacts for successive engagement by the arm 118, upon rotation of the latter. As best appears in FIG. 27, said contacts O, W, R, and WR are variously connected to the solenoids OS, WS and RS so as to successively energize such solenoids in successive positions of the wiper arm, and upon a further advance of the arm to concurrently energize a predetermined pair of such solenoids as WS and RS. Since unbalance of any work-piece is gauged by down travel afforded the head 28, and such travel is definitely proportioned to rotative travel of the feed-nut 41, and the gear 68 and arm 118 turn in unison with the feed-nut, it follows that rotary travel of said arm is definitely proportioned to the amount of unbalance of work being tested, the extent of such travel varying inversely to the amount of correction required by work under test. It is here again to be noted that downward travel afforded the head 28 varies in extent inversely as the amount of unbalanced weight in work undergoing test.

*Elevator for Raising and Lowering Work (FIGS. 1 and 2)*

In the construction disclosed by the aforementioned Patent 2,792,725, delivery of work to and its removal from the machine entail manual handling and a consequent considerable labor item, with no assurance of continuous operation at maximum testing capacity. As now improved, the machine is automatically supplied with work at suitable minimum intervals, and such work is automatically ejected after testing and marking thereof.

Spaced above the base 1 is an elevator 123 preferably of a grid form, and equipped with a set of parallel rollers 123a serving to seat work-pieces and facilitate their travel lengthwise of the elevator. Rigidly secured to the elevator end portions are a pair of duplicate vertical guide rods 123b, extending downwardly into the base and each slidable in upper and lower bearings 124 and 124a fixed on the base. To assure against any binding of said rods in their bearings and to provide for their travel in perfect unison, the rods are similarly formed with toothed racks 125 meshed with a pair of duplicate gears 126 similarly fixed on end portions of a horizontal shaft 127 journaled in end walls of the base.

Raising and lowering of the elevator is effected by a fluid motor comprising a piston 128 and its rod 128a, vertically reciprocatory in a cylinder 129 rigidly mounted on and within the base. The rod 128a extends freely through an opening 130 in the top plate of the base and has an actuating connection 131 to the elevator. In its lowered position shown in FIG. 2, the loading end of the elevator adjoins a conveyor 132 on which a row of work-pieces 13 await successive delivery to the elevator. Said conveyor is preferably of a driven-roller type, such as will immediately load a work-piece on the elevator when the latter assumes its lowered position. A bracket 133, rigidly depending from the loading end of the elevator, blocks any advance of work from the conveyor 132 when the elevator is fully or partially raised.

Upstanding from the base and spaced transversely of the machine and adapted to extend freely through openings in the lowered elevator, are a pair of similar pins 134, jointly abutted by each work-piece to establish its initial or loading position on the elevator (FIGS. 1, 19, 20). As will presently appear, such initial position must be quite accurate, and the spaced pins 134 coact to center the work in the longitudinal vertical medial plane of the elevator, while definitely limiting advance of the work. The pins are each fulcrumed at 135 upon and between paired uprights 136 welded or otherwise fixed on a plate 137 surmounting the base. The fulcrums are so disposed relative to the ends of the pins as to provide the latter with upper power arms considerably longer than their lower work arms. Tilting of each pin on its fulcrum is limited to a small angle, as for example three degrees, such angle being predetermined by adjustable stop screws 138 and 138a, a pair of which are reversely engageable by the work arm of each pin. A coiled spring 139 connected to the lower end of each pin tends to maintain the pivotal position of the pin shown in dash lines in FIG. 20. Work encountering the pins tilts them to the full line position FIG. 20, letting them act through the usual bell cranks 140 on push-buttons 141 of normally open limit switches LS1 and LS2. For obvious reasons, the pins 134 tilt preferably in planes radial to a work-piece inducing the tilting.

As best appears in the diagram (FIG. 27), when both limit switches LS1 and LS2 are closed, current is delivered to a solenoid 162 which then opens the usual valve (not shown) admitting air or some other energizing fluid to the lower end of the cylinder 129. The elevator 123 is thus driven to its raised position, shown in FIG. 3. A work-piece 13, engaging and tilting the pins 134, is thus sufficiently raised by the elevator to clear the pins.

As the elevator reaches its raised position, there is automatically closed a normally open limit switch LS3 (FIG. 23) surrounting the base 1 and having the usual actuating lever 144a terminally engaging a push-button 144' through which the switch is operated. At its other end, said lever engages the headed upper end of a plunger 144b, vertically slidable in a bearing 144c rigidly upstanding from the base. Fixed on the rock-shaft 127 within the base is an arm 144d adapted to apply an upthrust to said plunger, concurrently with arrival of the elevator at its raised position. It will be understood in above connection that rotation of the shaft 127 is accurately proportioned to up or down travel of the elevator, since such shaft is geared to and driven from the guide rods 123b traveling with the elevator. As will hereinafter more fully appear, the switch LS3 controls the circuit of a solenoid 163 actuating a valve (not shown) controlling a fluid motor 150—152. Through such motor and responsive to said switch, each arrival of the elevator at its upper limit initiates the advance of a work-piece from the loading end of the elevator to its unloading end. A swinging arm effecting such advance will now be described.

*Transfer Arm and Its Drive Means*

Raising of the elevator serves to enter in the central opening of the work-piece a vertical dowel 145 rigidly carried by and depending from the free end of a horizontal arm 146, hereinafter termed the transfer arm. The latter is fixed on the upper end of a tubular vertical rock-shaft 147 journaled in a tubular housing 148 rigidly mounted on the base 1 at the rear thereof, and is thus adapted to swing approximately lengthwise of the elevator for shifting work on the elevator from its loading end to the upwardly extended axis of the carrier 10. Below the housing 148, there is fixed on said rock-shaft by pins 147a a collar 147b, carrying a crank-arm 149 pivotally engaged by the piston rod 150 of a piston 151 reciprocating in a horizontal cylinder 152. A bracket 153 fixed on an end of the base 1 pivotally mounts said cylinder and affords a requisite swinging of the fluid motor 150—152 as it drives the rock-shaft.

As best appears in FIGS. 21 and 22, the collar 147b carries another arm 154 serving, in the respective limiting angular positions of the shaft, to effect closing of one or the other of two normally open limit switches LS4 and LS6. Adjustable stop-screws 155 are engageable by said arm to establish limits of rocking travel of the arm and to consequently limit travel of the transfer arm. The limit switches LS4 and LS6 are operated through the usual bell cranks 156 for purposes hereinafter explained. As the transfer arm completes its work-advancing travel, the advancing work-piece ejects a tested and marked piece which has been previously raised by the elevator so as to clear the carrier 10. A conveyor (not shown) may receive and remove the ejected work. An ejected piece is replaced by a newly advanced piece, and concurrently the switch LS4 is closed. This energizes the fluid motor 128—129 to effect downward actuation of the elevator, whereby the newly advanced piece is deposited on the carrier 10. In reaching its lowered position, the elevator closes a normally open limit switch LS5 (FIG. 2), surmounting the base 1. Said switch closes the circuit of a solenoid 163a serving, when thus energized, to actuate a valve (not shown) taking effect through the fluid motor 150—152 to swing the transfer arm 146 back to its position above the loading end of the elevator. Various other functions of the switch LS5 are hereinafter explained.

Operation and Electrical Diagram (FIG. 27)

The electric motor M may run continuously and without reversal in use of the machine. Alternating current is derived from mains A and B under control of a normally open starting switch 160, a normally closed stopping switch 161, and a relay M1. Upon momentary closing of the switch 160, said relay is energized and its contacts are held closed to maintain its energization and that of the motor.

At commencement of a cycle, the elevator 123 may have just assumed its lowered position. The transfer arm 146 will at such time be retracted as in full lines in FIG. 1, the control head 28 will be at its upper limit, as per FIG. 6, the work carrier 10 will be locked against pivotal play, and the balancing unit 10, 23, 25, 26 will be free of the clamp 57—63a. Also there will then be seated on the carrier 10 a work-piece to which the machine has applied markings indicating the amount and radial direction of any unbalanced weight.

Immediately upon assuming its lowered position, the elevator receives from the conveyor 132 a work-piece 13 to be tested and marked. Upon encountering the upright pins 134, the described piece is halted, after slightly tilting such pins. Responsive to such tilting (FIGS. 19 and 20), the series-connected limit switches LS1 and LS2 are closed, inducing uptravel of the elevator. In performing such function, the specified switches energize a circuit including lines L1—L5' and the solenoid 162, which is effective through a valve (not shown) to operate the fluid motor 128—129. As the elevator completes its uptravel, the pins 134 are released by said work-piece and thus allow the switches LS1 and LS2 to open responsive to the spring 139. Similarly a solenoid 162a serves, when energized as hereinafter explained, for lowering the elevator.

Upon completion of its uptravel, the elevator closes the aforementioned limit switch LS3 which then, through lines L6, L7, L8, L9, L11, L4, L5 and L5' energizes a solenoid 163 and also the coil of a relay CR2. The solenoid 163 takes effect through a valve (not shown) to energize the fluid motor 150—152 in a direction to swing the transfer arm 146 forwardly. Due to engagement of the dowel 145 with the last mentioned work-piece, said arm advances the latter on the elevator to the upwardly extended axis of the universal pivot 9, whereby said piece ejects from the machine the tested and marked piece which was elevated in unison with the piece now advanced.

In arriving at its forward position, shown in dash lines, FIG. 1, the transfer arm closes the switch LS4 and thus through lines L10, L10', L11, L12, L13, L3, L4, L5 and L5', energizes the solenoid 162a which takes effect through a valve (not shown) on the motor 128—129 to lower the elevator. Descending with the elevator, the work-piece now remaining thereon is delivered to a seat on the adapter 12b, being thus disposed for balance-testing and marking.

In reaching its lower limit, the elevator closes the aforementioned normally open switch LS5 which through lines L14, L15, L13, L13', L4, L5 and L5', energizes the coil of relay CR3 and also closes the circuit of solenoids 163a, 164, and 165 connected in parallel in such circuit and respectively serving to induce return of the transfer arm to its initial or rear position, to effect unlocking of the carrier 10 so that the unit 10, 23, 25, 26 may pivot responsive to any unbalance of the work, and to induce an application of the clamp 57—63a and thereby maintain any pivotal deflection of said unit.

Aforementioned energization of the relay CR3 takes effect on its two upper pairs of contacts to concurrently open the circuits of both magnetic brakes 56 and 85a, 85b, connected at L16 in parallel, and to close the circuit of the magnetic clutch 54, whereby a drive is established to the upper tubular shaft 47 from the constantly driven coaxial shaft 50. Said brake and clutch circuits are energized from direct current mains C and D. Through the gears 48, 48a and shaft 30, rotation of the control head 28 is now induced, and the radius-indicating marker 86—99 is driven in synchronism with such head through the belt 78, shaft 77, belt 84a, and spindle 83.

A switch LS7, normally open, is closed responsive to application of the clamp 57—63a and the relay CR4 is thereby energized. Such relay has an upper pair of normally closed contacts controlling the brake 55 through a line L17, and has a lower pair of normally open contacts, controlling the clutch 53 through a line L18, such brake and clutch taking effect on the lower tubular shaft 45. The energized relay releases the brake 55 and applies the clutch 53, whereby the lower tubular shaft is driven and applies rotation to the feed-nut 41, thus inducing down-travel of the control head 28 from its normally raised position. Said head continues its previously applied rotation in thus travelling downwardly. When the head 28 encounters the head 26, there is established a relatively low voltage circuit (preferably 6 volts) energized by a transformer 166 and including lines L19 and L20 and the coil of a relay CR5. Such relay has an upper pair of normally closed contacts in series with the coil of relay CR4, whereby the latter is deenergized responsive to energization of relay CR5 and consequently the brake 55 is applied and the clutch 53 released to terminate downward actuation of the head 28.

The head 28, now in contact with the head 26 (FIG. 10), continues its rotation until the contact element 40 engages the head 26. This closes a low voltage circuit including L19, L21, contact element 40, head 26, L22, L23, and grounded line L24, whereby the relay CR6 is energized, thus closing its four normally open pairs of contacts. These energize a time delay relay TR, the clamp-releasing solenoid 165a, the pivot-locking solenoid 164a, and the radius-marking solenoid 89. The latter induces discharge of a drop of wax upon the work from the device 86—99, and the position of such drop radial to the work indicates the radial direction of any unbalance of the work. One of said pairs of contacts of CR6 also controls a circuit including lines L25 and L26 and further including the wiper arm 118 of the aforementioned rotary switch (FIGS. 4A and 27). The contacts O, W, R, and WR of such switch are respectively connected through lines L27, L28, L29 and L30 to the respective coils of relays CR7, CR8, CR9 and CR10, and the normally open lower contacts of these relays are connected by lines L31, L32, L33, and L34 to the solenoids OS, WS, and RS. Such solenoids when energized, effect a discharge, in drop form, of three different colors of wax, as for example, orange, white, and red. The relay CR10 is adapted to effect concurrent discharge of two differently colored wax drops, as white and red. The various colors of the drops indicate various amounts of unbalanced weight, and another such amount will be indicated by any two other concurrent drops differing in color.

It is important to note that the wiper arm 118 energizes no circuit until its advance is completed, since such arm is not electrically effective until the relay CR6 is energized, and such relay is not energized until the control head 28 completes its down travel. Thus there is avoided any confusing delivery to the work of excessive wax drops.

A closed circuit through the wiper arm 118 at termination of any counter-clockwise advance thereof is essential to energization, then required, of at least one of the solenoids, OS, WS and RS. To assure such a circuit, the wiper arm and corresponding contacts are designed to allow the arm to momentarily bridge any two consecutive contacts O, W, R, and WR before advancing from one to the other. If, however, the arm occupies a bridging position, as exemplified in FIG. 27, at termination of its advance, there must occur, if permitted, an undesired energization of circuits including both bridged contacts. To avoid such occurrence, each relay of the series CR7—CR10 is equipped with an upper pair of normally closed contacts, exercising a control, through a selective one of the lines L27, L28, L29 and L30, of the relay next taking effect in said series. Exemplifying this relationship, the upper contacts of the relay CR8 control the line L29 through which the rotary switch is adapted to energize the relay CR9. It follows that when two of the switch contacts are bridged by the wiper arm, the relay first energized due to such bridging will prevent energization of the relay next in the series CR8—CR10, and there is avoided concurrent energization of two of the solenoids OS, WS, and RS, unless intended, as when CR10 is energized.

When energization of the relay TR results, as has been explained, from energization of relay CR6, the normally open contacts of the first-mentioned relay are closed after a short delay. This establishes a circuit including a line L35, a normally closed limit switch LS8 in such line, the coil of a relay CR11, and a line L36. The normally closed uppermost contacts of said relay CR11 are now opened, breaking a circuit including the brake 55 and lines L17 and L38. Said brake now being deenergized, the shaft 45 (lower of two aligned tubular shafts) is free to respond to the spiral spring 66a, and the feed-nut 41 is driven in a direction to raise the shaft 30 and control head 28. The delayed control exercised by the relay TR assures adequate time for the wax-applying marking devices to take effect. The relay CR11 has a second pair of normally closed contacts controlling the ground line L24 for the low voltage circuit leading to the control head 26 through lines L22 and L23. This circuit is therefore broken when the relay CR11 is energized, and there is thus afforded assurance against any inadvertent operation of the marking devices in case the head 28 in its uptravel encounters the head 26 due to oscillation of the latter. In reaching its upper limiting position, the head 28 opens the switch LS8, thus deenergizing the relay CR11 and allowing the brake 55 to take effect to maintain said head in such position. Since the ground line L24 is included in the circuit energizing CR6, the latter is deenergized when said ground line is broken at the relay CR11. The normally open lowermost contacts of the relay CR11 control a circuit including a line L39, the coil of such relay, a line L40, and the line L35 wherein the switch L38 is interposed. This assures continuance of energization of the relay CR11, when once established, until the control head 28 has regained its upper limiting position at which the switch LS8 is opened by such head. Thus a cycle of operation is completed and the various controls are disposed for commencement of a following cycle.

Installation of the switch LS9 in series with switches LS1 and LS2, is a safeguard against uptravel of the elevator unless the sleeve 17 is raised to protect the universal pivot from undue stress.

Also in series with LS1, LS2 and LS9, is the aforementioned normally open switch LS6, adapted to be closed by the transfer arm as the latter reaches its limiting position above the loading end of the elevator. Such closing of LS6 permits LS1 and LS2 to be energized, and to thus induce uptravel of the elevator when said arm arrives at said limit. If for any reason, a newly loaded work-piece takes effect prematurely on the switches LS1 and LS2, consequent closing of the last mentioned switches will induce no current flow, since LS6 breaks the circuit. In such event, the elevator will not rise until the transfer arm acts as above described to effect closing of LS6. The latter will be held closed by the arm until the arm is driven forward in the course of next following cycle.

To reduce complexity, the rotary switch controlling the relays CR7—CR10 has been disclosed as having only four contacts for successive engagement by the wiper arm 118. In practice, however, a larger arcuate series of such contacts is preferable, with a corresponding increase in the number of said relays and of the solenoids OS, WS and RS. Thus the marking devices may be adapted to indicate smaller increments of unbalanced weight, enabling the machine to provide more precise data.

Direct current is used for such circuits as energize the various magnetic brakes and clutches, being more effective for that purpose than alternating current.

What I claim is:

1. In a universal balance testing machine of a type comprising a balancing unit including a work carrier and a support rigidly downwardly extending from such carrier, a universal pivot mounting such unit and engaging its upper portion and establishing a fixed vertical axis and also an axis of equilibrium for the unit, such axes coinciding when the unit is in balance, a first control head fixed on the support at said axis of equilibrium, a second control head slidable up and down along said fixed axis to engage and disengage the first head and also rotatable about such axis, one of said heads having a circular periphery and the other head presenting to such periphery a substantially frusto-conical face, means for guiding the second head in its sliding travel, means for definitely limiting retraction of the second head from the first head and thus predetermining the maximum available clearance between the heads, the travel afforded the second head by the first head varying inversely to the divergency of said axes, the second head, in engaging the first head, establishing a point of tangency between the heads, and an electrical contact fixed on and substantially at the periphery of the second head and establishing a certain radius relative to said fixed axis, and movable by rotation of the second head to engage the first head at said point of tangency, the combination with a machine of said type, of a work-marking device spaced upwardly from the carrier and rotative about said fixed vertical axis, such device carrying a marking medium and an applicator for downwardly applying such medium to a workpiece on the carrier, such applicator establishing a radius with respect to said fixed axis parallel to the radius established by said contact relative to such axis, an electrical actuator for said applicator, a circuit for such actuator controlled by the relation of said contact to the first control head, and means for rotating the marking device and the second control head at the same angular velocity and thus maintaining parallelism between said radii, whereby a workpiece on the carrier is marked to indicate the angular position determined by its moment of unbalance.

2. A universal balance testing machine as defined in claim 1, said marking medium being a liquid and said applicator being a pump having a downwardly directed outlet.

3. A universal balance testing machine, comprising a balancing unit including a work carrier and a support rigidly downwardly extending from such carrier, a universal pivot mounting such unit and engaging its upper portion and establishing a fixed vertical axis and also an axis of equilibrium for the unit, such axes coinciding when the unit is in balance, a first control head fixed on the support at said axis of equilibrium, a second control head slidable along said fixed axis to engage and disengage the first head, one of said heads having a circular periphery and the other presenting to such periphery a substantially frusto-conical face, means for guiding the second head in its sliding travel and restraining it from material lateral travel, means for limiting retraction of the second head from the first head and thus determining a maximum available clearance between the heads, the travel afforded the second head by the first head varying according to any divergency of said axes, means for storing energy to retract the second head from the first head, a motor, mechanism driven by the motor for sliding the second head toward the first head and for concurrently storing energy in said storage means, and for alternatively driving the second head from said storage means to retract the second head from the first head, said mechanism including a clutch for interrupting the drive from the motor while maintaining the drive from said storage means, and means gaged by travel of the second head to indicate the amount of unbalance of a workpiece on said carrier.

4. A universal balance testing machine as set forth in claim 3, said storage means being a spring.

5. A universal balance testing machine, comprising a balancing unit including a work carrier and a support rigidly downwardly extending from such carrier, a universal pivot mounting the unit and engaging its upper portion and establishing a fixed vertical axis and also an axis of equilibrium for the unit, such axes coinciding when the unit is in balance, a first control head fixed on the support at said axis of equilibrium, a second control head slidable up and down along and rotatable about said fixed axis, said heads coacting to indicate the radial direction of any unbalance of a workpiece on the carrier, a marking device upwardly spaced from the carrier to afford clearance from a workpiece on the carrier, said device being rotatable about said fixed axis, means for rotating the second control head and the marking device in unison about said fixed axis, and means responsive to rotation of the second head for inducing a work-marking actuation of the marking device.

6. A universal balance testing machine as set forth in claim 5, the last mentioned means including an electric circuit, and a contact element upon and insulated from one of said control heads adapted to close said circuit by engagement with the other control head.

7. In a universal balance testing machine, the combination with a work carrier and a marking device spaced upwardly from the carrier to clear a workpiece on the carrier and formed with a plurality of chambers to receive differently colored liquid marking mediums, and including a plurality of pumps respectively having inlets thereto from the respective chambers and having outlets downwardly directed toward such carrier, of a plurality of electrical actuators respectively taking effect on the respective pumps, a plurality of circuits respectively controlling the respective actuators, and means for gaging the moment of unbalance of a workpiece on said carrier, such means including a motor and means driven by said motor for closing one or more of said circuits according to the gaged moment of unbalance, whereby the piece is marked to indicate said moment.

8. In a universal balance testing machine, the combination with a work carrier and a marking device spaced upwardly from said carrier to clear a workpiece on the carrier and formed with a plurality of chambers to receive differently colored liquid marking mediums, and including a plurality of pumps respectively having inlets thereto from the respective chambers and having outlets downwardly directed toward said carrier, of a plurality of actuators respectively taking effect on the respective pumps, means for gaging the moment of unbalance of a workpiece on said carrier, such means including a drive element, and means driven by such element for energizing one or more of said actuators according to the gaged moment of unbalance, whereby the piece is marked by one or more of said mediums to indicate said moment.

References Cited in the file of this patent
UNITED STATES PATENTS

| | | |
|---|---|---|
| 921,594 | Crane | May 11, 1909 |
| 1,263,840 | Barhite | Apr. 23, 1918 |
| 1,871,655 | Bond | Aug. 16, 1932 |
| 2,155,528 | Cadden | Apr. 25, 1939 |
| 2,520,348 | Tama | Aug. 29, 1950 |
| 2,541,574 | Crooks | Feb. 13, 1951 |
| 2,741,099 | Beane | Apr. 10, 1956 |
| 2,792,725 | Lannen | May 21, 1957 |
| 2,821,858 | King | Feb. 4, 1958 |
| 2,879,667 | Henderson | Mar. 31, 1959 |
| 2,881,929 | Giffen | Apr. 14, 1959 |
| 2,898,764 | Kinsey et al. | Aug. 11, 1959 |
| 2,937,613 | Larsh | May 24, 1960 |
| 2,954,695 | Nickell | Oct. 4, 1960 |
| 2,954,699 | Hemmeter | Oct. 4, 1960 |

FOREIGN PATENTS

| | | |
|---|---|---|
| 790,513 | Great Britain | Feb. 12, 1958 |

OTHER REFERENCES

Pages 56, 57, 59 and 60, Reference Data for Radio Engineers, third edition, published by Federal Telephone and Radio Co. in September 1953. (Copy available in Div. 36, U.S. Patent Office.)